(12) United States Patent
Chise

(10) Patent No.: US 11,280,284 B1
(45) Date of Patent: Mar. 22, 2022

(54) SYSTEMS AND METHODS FOR REMOTELY CONTROLLING SUBSYSTEMS INCLUDING EXHAUST SUBSYSTEMS OF A VEHICLE

(71) Applicant: OTR Performance, Inc., Macomb, MI (US)

(72) Inventor: Jason Chise, Macomb, MI (US)

(73) Assignee: OTR Performance, Inc., Macomb, MI (US)

( * ) Notice: Subject to any disclaimer, the term of this patent is extended or adjusted under 35 U.S.C. 154(b) by 399 days.

(21) Appl. No.: 16/427,459

(22) Filed: May 31, 2019

(51) Int. Cl.
| | |
|---|---|
| *F02D 41/02* | (2006.01) |
| *H04L 12/40* | (2006.01) |
| *H04W 12/00* | (2021.01) |
| *B60R 16/023* | (2006.01) |
| *B60W 50/02* | (2012.01) |
| *H04W 12/06* | (2021.01) |
| *H04W 84/04* | (2009.01) |
| *H04W 4/80* | (2018.01) |

(52) U.S. Cl.
CPC ........ *F02D 41/029* (2013.01); *B60R 16/0231* (2013.01); *B60W 50/0225* (2013.01); *H04L 12/40013* (2013.01); *H04W 12/009* (2019.01); *H04W 12/06* (2013.01); *H04W 4/80* (2018.02); *H04W 84/042* (2013.01)

(58) Field of Classification Search
CPC .............. F02D 41/029; B60R 16/0231; B60W 50/0225; H04L 12/40013
See application file for complete search history.

(56) References Cited

U.S. PATENT DOCUMENTS

| | | | | |
|---|---|---|---|---|
| 10,593,135 | B2 * | 3/2020 | Noyelle | G07C 5/008 |
| 2002/0181405 | A1 * | 12/2002 | Ying | H04W 24/00 370/245 |
| 2004/0053651 | A1 * | 3/2004 | Rieder | G08G 1/017 455/575.9 |
| 2005/0060070 | A1 * | 3/2005 | Kapolka | G07C 5/008 701/31.4 |
| 2008/0119136 | A1 * | 5/2008 | Khazi | H04W 88/10 455/41.2 |
| 2009/0007549 | A1 * | 1/2009 | Hagio | F02D 41/0245 60/286 |
| 2009/0165442 | A1 * | 7/2009 | Hara | F01N 9/005 60/286 |
| 2010/0313551 | A1 * | 12/2010 | Johnson | F01N 3/023 60/286 |

(Continued)

*Primary Examiner* — Gennadiy Tsvey
(74) *Attorney, Agent, or Firm* — Harness, Dickey & Pierce, P.L.C.; Stephen T. Olson

(57) ABSTRACT

A system for remotely controlling a plurality of subsystems of a vehicle comprises a processor and a memory storing instructions. When executed by the processor, the instructions cause the processor to send a signal via a wireless network to activate a control circuit connected to a Controller Area Network (CAN) bus in the vehicle. The instructions cause the processor to send a command via the wireless network to the control circuit to clear a fault code associated with one of a plurality of Electronic Control Units (ECUs) respectively controlling the plurality of subsystems of the vehicle via the CAN bus, to reset a parameter of one of the plurality of ECUs controlling an exhaust subsystem of the vehicle to a default value, or to initiate a forced regeneration of a diesel particulate filter of the exhaust subsystem of the vehicle.

20 Claims, 29 Drawing Sheets

(56) References Cited

U.S. PATENT DOCUMENTS

| | | | |
|---|---|---|---|
| 2011/0094210 A1* | 4/2011 | Suzuki | F02D 41/029 |
| | | | 60/295 |
| 2012/0227378 A1 | 9/2012 | Koestler | F01N 3/023 |
| | | | 60/274 |
| 2012/0282159 A1* | 11/2012 | Takayanagi | F01N 9/002 |
| | | | 423/212 |
| 2013/0031892 A1* | 2/2013 | Nagaoka | B01D 53/9477 |
| | | | 60/274 |
| 2013/0133315 A1* | 5/2013 | Shibutani | F01N 9/002 |
| | | | 60/311 |
| 2013/0159466 A1* | 6/2013 | Mao | H04L 67/2833 |
| | | | 709/218 |
| 2013/0227933 A1* | 9/2013 | O'Neil | F01N 3/023 |
| | | | 60/274 |
| 2013/0304306 A1* | 11/2013 | Selkirk | G07C 5/0808 |
| | | | 701/31.4 |
| 2014/0073254 A1* | 3/2014 | Ichihara | H04W 12/033 |
| | | | 455/41.2 |
| 2015/0020503 A1* | 1/2015 | Adelman | F01N 3/023 |
| | | | 60/274 |
| 2015/0051787 A1* | 2/2015 | Doughty | G07C 5/008 |
| | | | 701/31.5 |
| 2015/0180840 A1* | 6/2015 | Jung | H04L 67/34 |
| | | | 713/150 |
| 2016/0171791 A1* | 6/2016 | Cervantes | G07C 5/008 |
| | | | 701/31.5 |
| 2017/0213398 A1* | 7/2017 | Grenn | G07C 5/0808 |
| 2017/0370266 A1* | 12/2017 | Togawa | F01N 3/05 |
| 2018/0223755 A1* | 8/2018 | Shock | F01N 11/00 |
| 2019/0043272 A1* | 2/2019 | Yang | G07C 5/085 |

\* cited by examiner

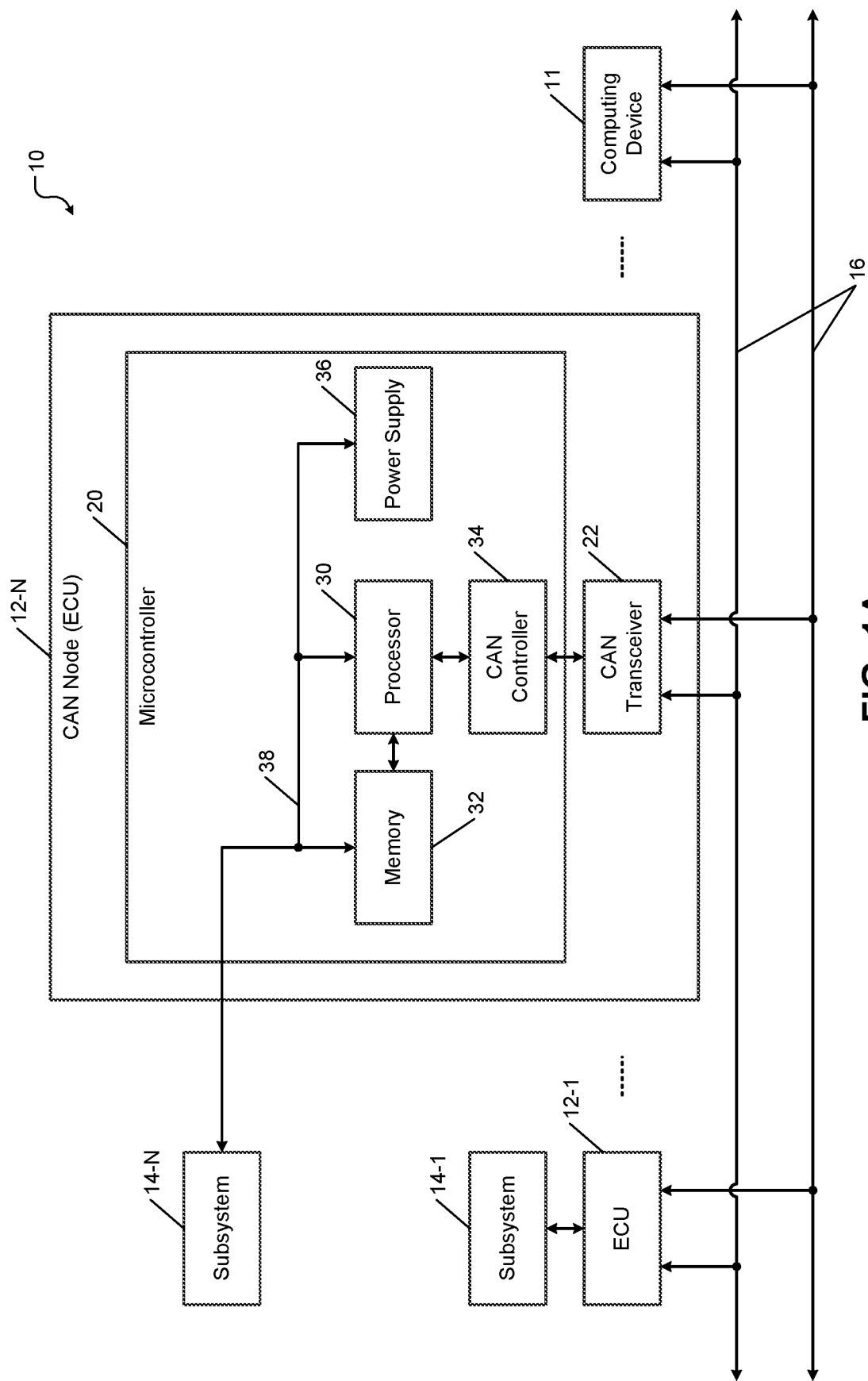

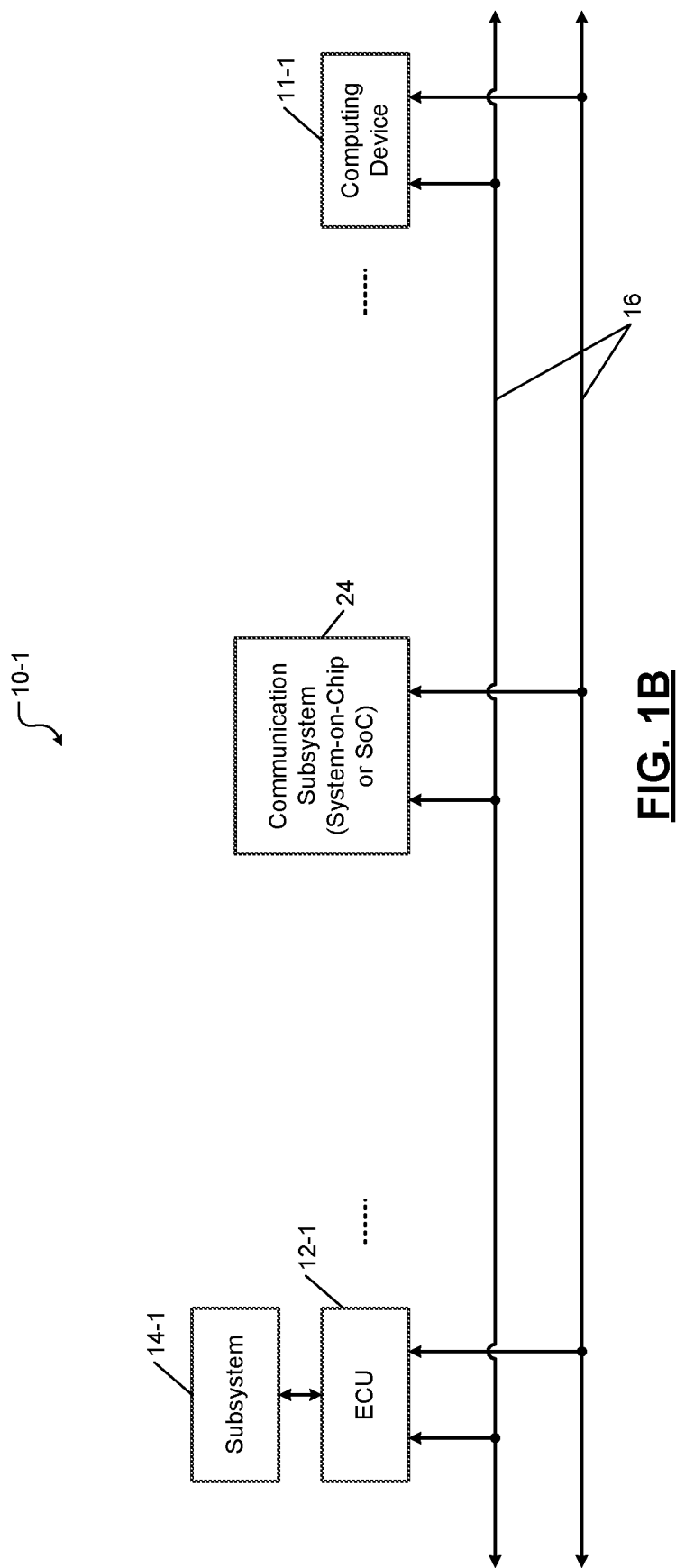

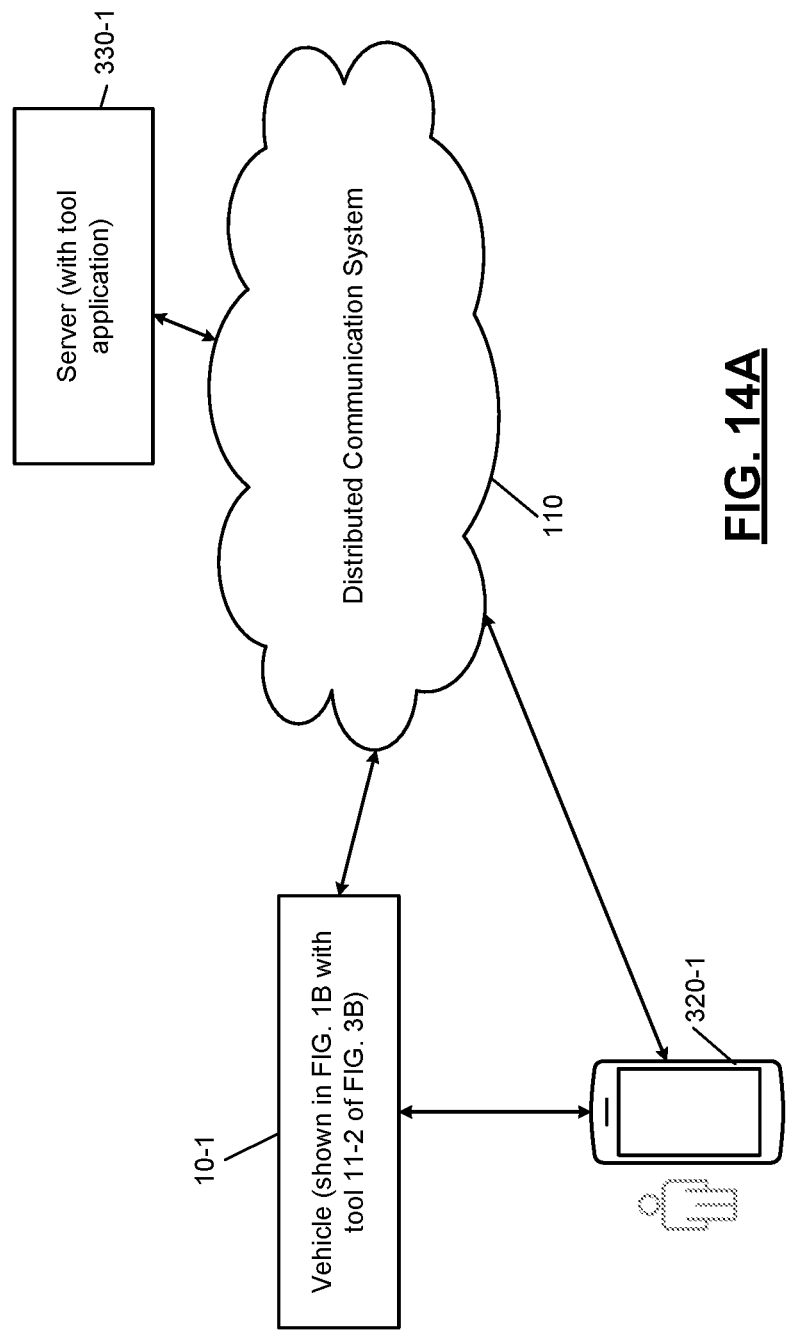

SYSTEMS AND METHODS FOR REMOTELY CONTROLLING SUBSYSTEMS INCLUDING EXHAUST SUBSYSTEMS OF A VEHICLE

FIELD

The present disclosure relates to systems and methods for remotely controlling subsystems including exhaust subsystems of a vehicle.

BACKGROUND

The background description provided here is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

A vehicle typically includes an electronic control system to control various subsystems of the vehicle. For example, the electronic control system includes control modules (generally called electronic control units or ECUs) that control various aspect of subsystems such as an engine, a transmission, an exhaust subsystem, a braking subsystem, and so on of the vehicle. Some of the subsystems include various sensors that sense various parameters and conditions of the subsystems and provide the sensed data to the respective control modules. Some of the subsystems also include various actuators that perform operations based on data received from the respective control modules.

Many of the control modules include onboard diagnostic (OBD) programs that can diagnose some of the problems associated with the respective subsystems based on data sensed by the sensors in the subsystems. Further, some of the diagnostic programs can send commands to the subsystems to perform diagnostic tests on some of the components of the subsystems to identify problems with the subsystems and to verify whether the components and the subsystems operate properly. The diagnostic programs can generate fault codes that can be displayed on a display (e.g., on a dashboard) of the vehicle to indicate the problems and statuses of the subsystems.

While some of the problems can be identified using the onboard diagnostic programs, some other problems cannot be identified using the onboard diagnostic programs and require special diagnostic equipment (e.g., a special computer with advanced diagnostic programs) typically available at a service station (e.g., a dealership). Further, some of the problems identified using the onboard diagnostic programs cannot be solved using the onboard diagnostic programs and require the special diagnostic equipment.

SUMMARY

A system for remotely controlling a plurality of subsystems of a vehicle comprises a processor and a memory storing instructions. When executed by the processor, the instructions cause the processor to send a signal via a wireless network to activate a control circuit connected to a Controller Area Network (CAN) bus in the vehicle. The instructions cause the processor to send a command via the wireless network to the control circuit to clear a fault code associated with one of a plurality of Electronic Control Units (ECUs) respectively controlling the plurality of subsystems of the vehicle via the CAN bus, to reset a parameter of one of the plurality of ECUs controlling an exhaust subsystem of the vehicle to a default value, or to initiate a forced regeneration of a diesel particulate filter of the exhaust subsystem of the vehicle.

In other features, the instructions cause the processor to communicate with a mobile device via the wireless network and to send the signal, the command, or both to the control circuit via the mobile device. The mobile device communicates with the control circuit using a short range wireless communication protocol.

In other features, the wireless network includes a cellular network, and the short range wireless communication protocol includes Bluetooth.

In other features, the instructions cause the processor to send the command to the control circuit to clear the fault code or to reset the parameter in response to an engine of the vehicle being turned off.

In another feature, the instructions cause the processor to send the command to the control circuit to initiate the forced regeneration in response to an engine of the vehicle being turned on and a speed of the vehicle being zero.

In another feature, the instructions cause the processor to send the command to the control circuit to initiate the forced regeneration in response to a parked regeneration of the diesel particulate filter being disabled.

In another feature, the instructions cause the processor to perform a security handshake with the control circuit via the wireless network before sending the command to the control circuit.

In another feature, the command causes the control circuit to perform an authentication procedure with one or more of the plurality of ECUs and secure read/write access to the one or more of the plurality of ECUs.

In another feature, the command causes the control circuit to reset data learned by one or more of the plurality of ECUs.

In another feature, the parameter includes a soot level of the diesel particulate filter, an ash level of the diesel particulate filter, a zone level of the diesel particulate filter, regeneration timers of the diesel particulate filter, data learned after a prior regeneration of the diesel particulate filter, NOx sensor data, or an efficiency of a selective catalytic reduction component of the exhaust subsystem.

In still other features, a system for controlling a plurality of subsystems of a vehicle comprises a control circuit to communicate with a plurality of Electronic Control Units (ECUs) of the vehicle respectively controlling the plurality of subsystems of the vehicle via a Controller Area Network (CAN) bus of the vehicle. The system comprises a communication circuit to receive a command from a remote device via a wireless network for the control circuit to clear a fault code associated with one of the plurality of ECUs, to reset a parameter of one of the plurality of ECUs controlling an exhaust subsystem of the vehicle to a default value, or to initiate a forced regeneration of a diesel particulate filter of the exhaust subsystem of the vehicle.

In other features, the communication circuit is configured to communicate with a mobile device using a short range wireless communication protocol, and the mobile device is configured to receive the command from the remote device via the wireless network.

In other features, the wireless network includes a cellular network, and the short range wireless communication protocol includes Bluetooth.

In other features, the control circuit is configured to clear the fault code or reset the parameter in response to an engine of the vehicle being turned off.

In another feature, the control circuit is configured to initiate the forced regeneration in response to an engine of the vehicle being turned on and a speed of the vehicle being zero.

In another feature, the control circuit is configured to initiate the forced regeneration in response to a parked regeneration of the diesel particulate filter being disabled.

In another feature, the communication circuit is configured to receive a signal to activate the control circuit from the remote device via the wireless network before receiving the command from the remote device via the wireless network.

In another feature, the control circuit is configured to perform a security handshake with the remote device via the wireless network before receiving the command from the remote device via the wireless network.

In another feature, in response to receiving the command, the control circuit is configured to perform an authentication procedure with one or more of the plurality of ECUs and secure read/write access to the one or more of the plurality of ECUs.

In another feature, in response to receiving the command, the control circuit is configured to reset data learned by one or more of the plurality of ECUs.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A shows a plurality of subsystems of a vehicle and a reset tool connected to each other using a Controlled Area Network (CAN) bus in the vehicle;

FIG. 1B shows a system comprising the plurality of subsystems, the reset tool, and a communication subsystem in the form of a system-on-chip (SoC) interconnected using the CAN bus in the vehicle;

FIGS. 8A-14B show various implementations of the systems and methods of the present disclosure using the distributed computing system.

In the drawings, reference numbers may be reused to identify similar and/or identical elements.

DETAILED DESCRIPTION

Overview

Figure 2:
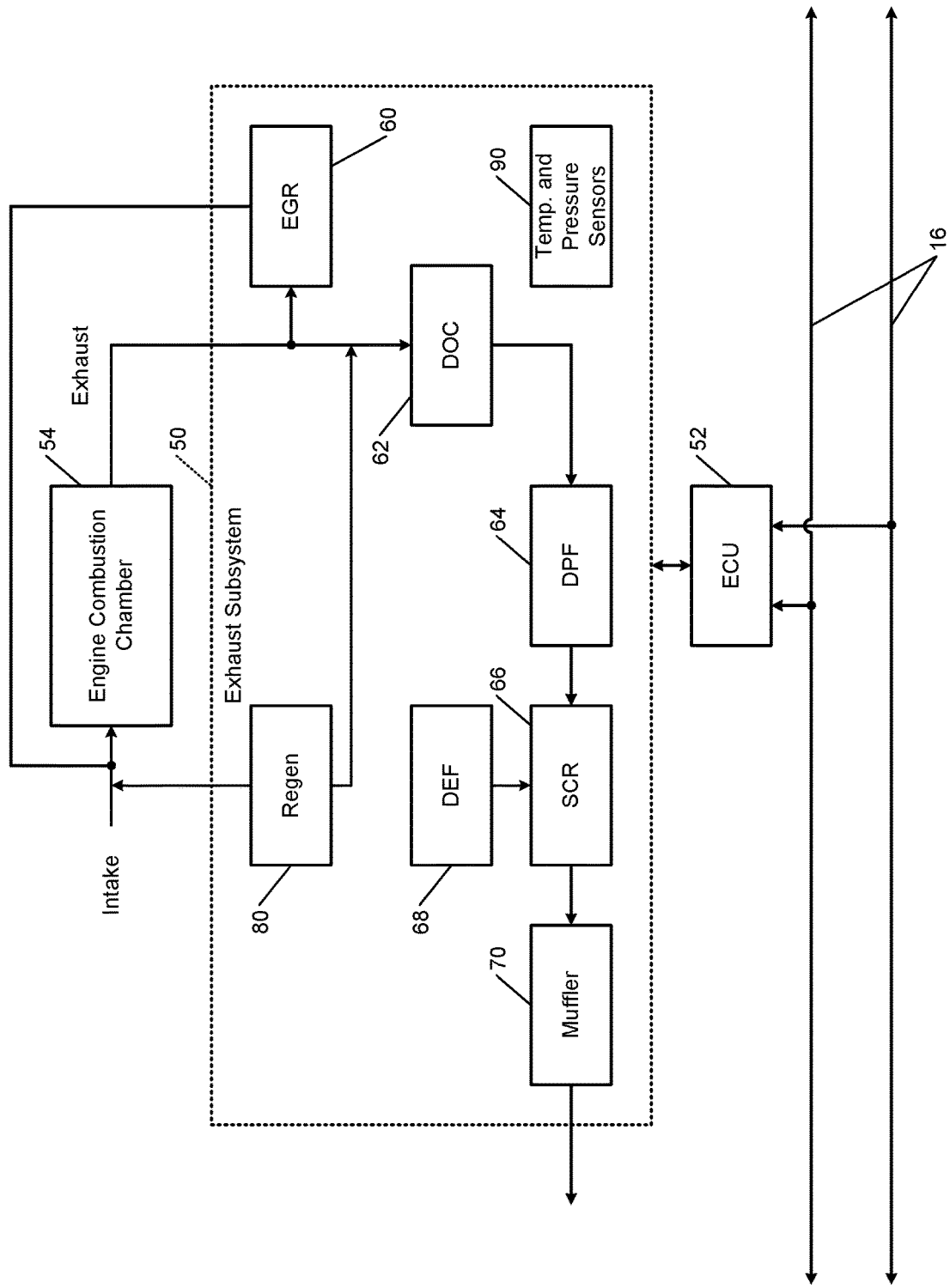
FIG. 2 shows a functional block diagram of an example of an exhaust subsystem of a vehicle equipped with a diesel engine.

The present disclosure relates to numerous systems and methods for remotely controlling various subsystems of a vehicle. Specifically, the subsystems of the vehicle can be controlled using an application running at a remote location (e.g., in a cloud). The application can communicate with the subsystems of the vehicle via a device installed in the vehicle. For example, the device can include pre-existing communication subsystem (e.g., an integrated circuit or a chip) already installed in the vehicle, a customized communication chip installed in the vehicle, and/or a reset tool installed in the vehicle. In some implementations, the pre-existing communication subsystem or the customized communication chip may be utilized and/or configured to perform functions of the reset tool. In addition, in some implementations, a mobile device (e.g., a smartphone carried by a driver of the vehicle) including a mobile application (called an app) can be used in conjunction with the remote application and the device installed in the vehicle to control the subsystems. These and other features of the present disclosure are described below in detail.

The systems and methods of the present disclosure solve the following problems. A driver of a vehicle can be stranded on a roadway if a fault condition detected by an onboard diagnostic program of a subsystem of the vehicle prevents the vehicle from being driven and requires the vehicle to be towed to a service station for servicing the subsystem. Sometimes, a special diagnostic equipment at the service station may discover that the fault code was merely a stray or ghost fault code and was not an actual problem with the subsystem. In such a situation, the service station uses the special diagnostic equipment to simply reset or clear the fault code, and the driver can drive the vehicle. This can significantly inconvenience the driver.

Some subsystems of the vehicle may provide warnings that alert the driver to schedule service for the subsystems but allow the vehicle to be driven for a grace period. If the subsystem is not serviced during the grace period, a fault code or an indication may be displayed on a dashboard of the vehicle, and the vehicle cannot be driven until service is performed. For example, diesel powered vehicles use a diesel particulate filter (DPF) in exhaust subsystems (also called after-treatment or AFT systems). The DPF can periodically get clogged due to soot buildup and may require cleaning and/or regeneration. Until the soot level is less than a predetermined amount, a control module controlling the AFT system performs limited regeneration operations while the vehicle is being driven. However, after the soot level exceeds the predetermined amount, the vehicle cannot be driven and must be towed to a service station for performing repair or replacement of the DPF. The service station uses a special diagnostic equipment that verifies various parameters of the after-treatment system and other control systems of the vehicle and performs a special procedure called a forced regeneration of the DPF. Alternatively, the DPF is thoroughly cleaned, or replaced. These options can prevent the vehicle from being used for a day or more, and the downtime of the vehicle can be costly.

One solution to address the above problems is a reset tool that clears fault codes, resets the AFT system, and, if necessary, performs a forced regeneration of the DPF anywhere without requiring any special diagnostic equipment, without visiting a service center, and without connecting to any remote device via a network. The reset tool can be installed in the vehicle or may be portable and can be plugged into a diagnostic port (e.g., onboard diagnostic or OBD port) of the vehicle. When the onboard diagnostics of a subsystem indicates a fault code or condition, whether the fault code allows the vehicle to be driven or not, the reset tool can clear the fault code, reset the AFT system, and, if necessary, perform a forced regeneration often without any input from or interaction with the driver.

A portable reset tool does not include any display to show any output to the driver or any keypad to allow any input from the driver to perform these functions, which typically can be performed only by a trained technician by interactively using specialized equipment at a service center. The reset tool also does not require a connection to a remote computing device via a network such as a cellular network or the Internet to perform these functions.

Depending on the fault code, after clearing the fault code using the reset tool, the vehicle can be driven for a while, and the driver is not stranded on the road. Depending on the fault code, or if the fault code reappears while the vehicle is being driven after clearing the fault code, the vehicle can be driven to a service station. Further, if the fault code indicates that the DPF must be serviced or replaced, the reset tool automatically performs a forced regeneration without requiring any special diagnostic equipment and without visiting a service center.

The portable reset tool operates automatically when plugged into the vehicle. That is, after the reset tool is plugged into the vehicle, the reset tool performs different operations using a combination of a duration for which the reset tool is plugged into the vehicle and based on whether the engine is running when the reset tool is plugged into the vehicle. For example, if the engine is not running when the reset tool is plugged into the vehicle, the reset tool resets fault codes during a first time period after being plugged into the vehicle and further resets the AFT subsystem if the reset tool remains plugged into the vehicle beyond the first time period for a second time period. On the other hand, if the engine is running while the vehicle is parked when the reset tool is plugged into the vehicle, the reset tool performs the forced regeneration. Accordingly, the portable reset tool becomes the master (i.e., gains control of the vehicle) as soon as the reset tool is plugged into the vehicle. Examples of the portable reset tool are shown and described below with reference to FIGS. 3A and 3B.

Instead, the reset tool of the present disclosure operates in a slave mode. That is, the reset tool is already installed (i.e., hardwired) in the vehicle (i.e., does not need to be plugged into the vehicle) and always receives power as soon as the vehicle is turned on. However, the reset tool does not perform any of the above operations (resetting fault codes, resetting the AFT subsystem, or forced regeneration) unless a remote application instructs the reset tool to perform an operation. The reset tool performs any of the above operations only after the remote application activates the reset tool, determines that the reset tool is online, and sends a command to the reset tool to perform any of the above operations.

Further, as explained below in detail, the systems and methods of the present disclosure can leverage any existing communication subsystem in the vehicle and an existing application that remotely communicates with the vehicle through the existing communication subsystem, to remotely control the various subsystems of the vehicle. The existing communication subsystem and application can be customized to perform the functions of the reset tool and to remotely control the various subsystems of the vehicle. However, the existing communication subsystem and application are not prerequisites for the systems and methods of the present disclosure. In some implementations, the systems and methods can include a customized communication chip (integrated with the functionality of the reset tool) installed in the vehicle and optionally a mobile app that can be used with a customized application running remotely (e.g., in a cloud) to access the reset tool installed in the vehicle to control the various subsystems of the vehicle. Examples of a pre-existing communication subsystem, a modified pre-existing communication subsystem, and a customized communication chip, which can be utilized as the reset tool, are shown and described below with reference to FIGS. 4A-4C.

In some implementations, the portable reset tool can also be controlled using an existing communication subsystem in the vehicle and an existing application that remotely communicates with the vehicle through the existing communication subsystem, to remotely control the various subsystems of the vehicle. In some implementations, the portable reset tool can also be retrofitted with a communication chip, and the retrofitted portable reset tool can be controlled using an application running remotely (e.g., in a cloud) to control the various subsystems of the vehicle. An example of such a retrofitted portable reset tool is shown and described below with reference to FIG. 3B.

The systems and methods of the present disclosure can be implemented in many ways using the various configurations of the reset tool and the communication subsystem SoC incorporating the functionalities of the reset tool, which are shown and described below with reference to FIGS. 3A-4C. Examples of these various implementations are shown and described below with reference to FIGS. 8A-14B.

Organization

The present disclosure is organized as follows. A system comprising a plurality of subsystems of a vehicle and a reset tool interconnected using a Controlled Area Network (CAN) bus in the vehicle is shown and described with reference to FIG. 1A. A system comprising the plurality of subsystems, the reset tool, and a communication subsystem in the form of a system-on-chip (SoC) interconnected using the CAN bus in the vehicle is shown and described with reference to FIG. 1B. A diesel exhaust subsystem of the vehicle is shown and described with reference to FIG. 2. Various configurations of the reset tool and the communication subsystem SoC integrated with the functionalities of the reset tool are shown and described with reference to FIGS. 3A-4C. A broad overview of the operations performed by the systems and methods of the present disclosure is shown and described with reference to FIG. 5. Detailed flowcharts of various procedures performed by the systems and methods of the present disclosure are shown and described with reference to FIGS. 6A-6C. A client-server based distributed computing system for implementing the various systems and methods of the present disclosure is shown and described with reference to FIGS. 7A-7C. Various configurations for implementing the systems and methods of the present disclosure using the distributed computing system are shown and described with reference to FIGS. 8A-14B.

System Block Diagrams

Automotive electronic control systems are typically implemented as Electronic Control Units (ECUs) that are connected to each other by a Controller Area Network (CAN) bus. Each ECU controls a specific subsystem (e.g., engine, transmission, exhaust, braking, heating and cooling, infotainment, navigation, and so on) of the vehicle. Each ECU includes a microcontroller, a CAN controller, and a transceiver. In each ECU, the microcontroller includes a processor, memory, and other circuits to control the specific subsystem. Each ECU can communicate with other ECUs via the CAN bus through the CAN controller and the transceiver.

FIG. 1A shows an example of a vehicle 10 comprising a plurality of ECUs connected to each other by a CAN bus. A computing device 11 such as a reset tool according to the present disclosure can be connected to the CAN bus. For example, the reset tool can be portable and can be connected to the vehicle 10 via a port available on the driver side (e.g., under the steering wheel) of the vehicle 10. For example, the port may include a diagnostic port with a connector. For example only, the connector may include a J1939 plug or an OBD2 connector. The computing device 11 receives power from a battery of the vehicle 10 via the port, connects to the CAN bus via the port, communicates with the plurality of ECUs via the CAN bus, and performs operations including clearing fault codes, resetting operating parameters and learned data, performing forced regenerations, and so on. Alternatively, the reset tool can be in the form a pre-existing or customized communication subsystem system-on-chip (SoC) that communicates with the CAN bus via a transceiver similar to any other subsystem of the vehicle. The communication subsystem SoC can be integrated with the functionalities of the reset tool and can perform operations including clearing fault codes, resetting operating parameters and learned data, performing forced regenerations, and so on.

Various configurations of the reset tool according to the present disclosure are shown and described below in detail with reference to FIGS. 3A-4C. In addition to including the components of the reset tool shown in FIGS. 3A-4C, the computing device 11 includes one or more components of an ECU 12 described below. Accordingly, the computing device 11 can communicate with the CAN bus and can interface (i.e., exchange data) with the ECUs 12 via the CAN bus.

The plurality of ECUs includes ECU-1 12-1, ECU-2 12-2, . . . , and ECU-N 12-N (collectively, ECUs 12), where N is a positive integer. Hereinafter, ECU 12 refers to any of the plurality of ECUs 12. While FIG. 1A shows a detailed functional block diagram of only the ECU-N 12-N, it is understood that other ECUs 12 can have structure similar to the ECU-N 12-N. Each ECU 12 or any portion thereof may be implemented as one or more modules (the term module is defined below).

Each ECU 12 controls a respective subsystem of the vehicle 10. For example, the ECU-1 12-1 controls a subsystem 14-1, the ECU-2 12-2 controls a subsystem 14-2, . . . , and the ECU-N 12-N controls a subsystem 14-N. Collectively the subsystems 14-1, 14-2, . . . , and 14-N are referred to as subsystems 14. Non-limiting examples of the subsystems 14 include an engine subsystem, a transmission subsystem, an exhaust subsystem, a brake subsystem, a traction subsystem, a suspension subsystem, a climate subsystem, a safety subsystem, an infotainment subsystem, a navigation subsystem, a physiological data acquisition subsystem, a driving data acquisition subsystem, and so on.

Each subsystem 14 may include one or more sensors to sense data from one or more components of the subsystem 14. For example, the exhaust subsystem may include pressure and temperature sensors and soot level sensors to collect data from the components of the exhaust subsystem of the vehicle 10 (e.g., see an example of the exhaust subsystem shown in FIG. 2). The engine subsystem may include sensors to collect data such as revolutions per minute (RPM), temperature, fuel efficiency, various fluid levels, and other data associated with the engine subsystem of the vehicle 10; and so on. Some of the subsystems 14 may include one or more actuators to actuate one or more components of the respective subsystems 14.

An ECU 12 may receive data from one or more sensors of a corresponding subsystem 14. Depending on the type of ECU, the ECU 12 may also receive one or more inputs from an occupant and/or operator of the vehicle 10. The ECU 12 may control one or more actuators of the corresponding subsystem 14 based on the data received from the one or more sensors and/or the one or more inputs.

The ECUs 12 are connected to a CAN bus 16. The ECUs 12 can communicate with each other and with the computing device 11 via the CAN bus 16. The ECUs 12 can communicate with other devices connected to the CAN bus 16 (e.g., a communication gateway, etc.). Each ECU 12 includes a microcontroller 20 and a CAN transceiver 22. The microcontroller 20 communicates with the subsystem 14 controlled by the ECU 12. The CAN transceiver 22 communicates with the CAN bus 16.

The microcontroller 20 includes a processor 30, a memory 32, a CAN controller 34, and a power supply 36. The memory 32 includes volatile memory (RAM) and may additionally include nonvolatile memory (e.g., flash memory) and/or other types of data storage device(s). The processor 30 and the memory 32 communicate with each other via a bus 38. The processor 30 executes code stored in the memory 32 to control the subsystem 14. The power supply 36 supplies power to all of the components of the microcontroller 20 and the ECU 12. The CAN controller 34 communicates with the CAN transceiver 22.

Each ECU 12 can employ security protocols to authenticate access to and communication with the ECU 12 by other ECUs 12, devices, and/or systems external to the vehicle 10. For example, in some vehicles, ECUs that handle communication with devices and/or systems external to the vehicle 10 may employ a higher level of security to prevent hacking. Further, in some vehicles (e.g., autonomous vehicles), the CAN bus may comprise multiple portions, of which some portions may employ a higher level security than the other portions. Some of the ECUs 12 that control some critical operations of the vehicle 10 (e.g., operations to navigate an autonomous vehicle) may be connected to the portion of the CAN bus requiring higher level authentication. Further, some of the ECUs 12 can require other ECUs and external devices (e.g., the computing device 11) to establish a lower level authentication to read data from the ECUs but require a higher level authentication to write data to (e.g., program some aspects of) the ECUs 12.

In some examples, the speed of the CAN bus 16 can vary in different vehicles. For example, broadly speaking, one version of the CAN bus may be slower (e.g., operate at a relatively lower data rate) while another version of the CAN bus may be faster (e.g., operate at relatively faster data rate). Consequently, the speed at which data can be communicated between the ECUs 12 on the CAN bus 16 and between the computing device 11 and the ECUs 12 via the CAN bus 16 can vary depending on the speed of the CAN bus 16 in a vehicle.

FIG. 1B shows another example of a vehicle 10-1. The vehicle 10-1 includes the plurality of ECUs 12 and the plurality of subsystems 14 of the vehicle 10 shown in FIG. 1A. These elements operate as described with reference to FIG. 1A and are therefore not described again for brevity. In addition, the vehicle 10-1 includes a computing device 11-1 (i.e., the reset tool) and a communication subsystem SoC 24. For example, the communication subsystem SoC 24 may include any pre-existing communication chip that is already installed in the vehicle 10-1. For example, the communication subsystem SoC 24 may include an electronic logging device (ELD) or any other device that is capable of communicating with one or more of the ECUs 12 and with a remote application. Alternatively, the communication subsystem SoC 24 may include a device similar to the ELD and may include a portion of the reset tool (e.g., a portion of the computing device 11). In some implementations, the communication subsystem SoC 24 may include a device similar to the ELD and may include a communication circuit such as a Bluetooth circuit. Essentially, the communication subsystem SoC 24 allows a remote application to communicate with the subsystems 14 of the vehicle 10-1 and to interface with the reset tool (implemented within the communication subsystem SoC 24 or as the computing device 11-1) to perform the operations of the reset tool. The communication subsystem SoC 24 is connected to the CAN bus 16 via a corresponding ECU 12. In some implementations, the communication subsystem SoC 24 may be integrated with the corresponding ECU 12.

Various configurations of the reset tool are shown as elements 11-1, 11-2 and are described in further detail below with reference to FIGS. 3A and 3B. These configurations of the reset tool may be portable (i.e., may be pluggable into the vehicle 10 or 10-1) or may be hardwired to the CAN bus 16 in the vehicle 10 or 10-1. Various configurations of the communication subsystem SoC 24 are shown as elements 24-1, 24-2, 24-3 and are described below in detail with reference to FIGS. 4A-4C. Essentially, elements 11, 11-1, 11-2, 24, 24-1, 24-2, 24-3 may, individually or in combination, operate as the reset tool, communicate with a remote application, and perform the operations of the reset tool in conjunction with the remote application. For example, in some implementations, the reset tool 11 may alone be used without using the communication subsystem SoC 24. In some implementations, the reset tool 11 may be used with the communication subsystem SoC 24. In some implementations, the communication subsystem SoC 24, which includes some of the functionalities of the reset tool 11, may be used alone. In some implementations, in addition, an app on a mobile device (e.g., carried by the driver) may also be used. Each of the elements 11, 11-1, 11-2, 24, 24-1, 24-2, 24-3 represents a different configuration of the reset tool. Accordingly, these elements may be collectively referred to as the reset tool. These different configurations of the reset tool 11 and the communication subsystem SoC 24 make feasible various ways of implementing the systems and methods of the present disclosure as shown and described in further detail with reference to FIGS. 8A-14B.

FIG. 2 shows a functional block diagram of an example of an exhaust subsystem 50 of a vehicle (e.g., the vehicles 10 and 10-1 shown in FIGS. 1A and 1B) equipped with a diesel engine. FIG. 2 introduces the elements or components of the exhaust subsystem for a diesel engine that can be controlled using the computing device 11 (i.e., the reset tool 11-1 or 11-2) as described below with reference to FIGS. 3A-3B and/or using the communication subsystem SoC 24 as described below with reference to FIGS. 3A-4C. Accordingly, the description of FIG. 2 provides the level of detail that is necessary to understand the operation of the computing device 11 and its interaction with the exhaust subsystem 50. Further details such as the chemistry and thermodynamics involved in the operation of the various components of the exhaust subsystem are unnecessary to understand the operation of the computing device 11 and are therefore omitted.

The exhaust subsystem 50 is also called an after-treatment (AFT) system and may be referred to as the AFT 50. The AFT 50 processes exhaust materials (e.g., carbon monoxide (CO), NOx, soot, etc.) generated by a diesel combustion engine, of which a combustion chamber is shown at 54 (hereinafter called the engine 54). The AFT 50 communicates with other ECUs of the vehicle (e.g., ECUs 12 of the vehicle 10 shown in FIG. 1A) via the CAN bus 16. An ECU 52, which is similar to the ECUs 12 shown in FIG. 1A, controls the AFT 50.

While only one ECU 52 is shown, in some applications, more than one ECU may be used to control one or more components of the AFT 50. For example, an ECU 52-1 may control the DPF 64, an ECU 52-2 may control a regeneration component 80, and so on. Accordingly, operations performed on the ECU 52 by the computing device 11 described below with reference to FIG. 3A-4C can be extended to ECU 52-1, ECU 52-2, and so on.

In some implementations, the ECU 52 that controls the AFT 50 may also be an engine ECU. That is, an ECU 12 that controls the engine subsystem 14 may also control the AFT 50. For example, the ECU 12 that controls the engine subsystem 14 may initiate the forced regeneration described below. In other words, the ECU 12 that controls the engine subsystem 14 may also perform one or more functions and operations of the ECU 52.

The AFT 50 comprises an exhaust gas recirculation (EGR) component 60, a diesel oxidation catalyst (DOC) component 62, a diesel particulate filter (DPF) 64, a selective catalytic reduction (SCR) component 66, a diesel exhaust fluid (DEF) component 68, and a muffler 70. In addition, the AFT 50 comprises a regeneration component 80 that regenerates the DPF 64. Further, the AFT 50 comprises a plurality of temperature and pressure sensors 90 that are located throughout the AFT 50. The sensors 90 provide feedback to one or more components of the AFT 50 as well as to other subsystems of the vehicle via the ECU 52. The sensors 90 are not shown in further detail to simplify the illustration of the components 60-80 of the AFT 50. Further, the AFT 50 also comprises various valves and manifolds, which are also omitted to simplify the illustration of the components 60-80 of the AFT 50.

The EGR 60 helps reduce NOx emissions from the muffler 70. The EGR 60 comprises an EGR valve mounted on an exhaust manifold. The EGR valve regulates the exhaust gas that goes into the engine 54. A portion of the exhaust gas is re-directed and routed into an intake manifold of the engine 54. The intake manifold includes a temperature sensor and a differential pressure sensor (e.g., the sensors 90) to sense the flow of air entering into intake manifold. A turbocharger (not shown) regulates a charge pressure and controls the EGR 60 to create proper turbo drive pressures for the proper amount of EGR flow. While the EGR 60 helps reduce NOx emissions, the EGR 60 causes the engine 54 to create soot due to the mixing of the exhaust gas and fresh air and due to incomplete combustion of fuel. The DPF 64 reduces the soot emissions from the muffler 70 as explained below.

The DOC 62 is located in the exhaust pipe between the EGR 60 and the DPF 64. The DOC 62 uses a series of small passages made of precious metals that route the exhaust gas to come in contact with the precious metals. The DOC 62 reduces unburned hydrocarbons and carbon monoxide (CO) in the exhaust gas by burning (oxidizing) them over a catalyst. This catalyst aids the reaction of the CO and hydrocarbons with remaining oxygen in the exhaust gas. This process can be used to increase the temperature of the exhaust system, which helps in burning the soot as explained below.

The DPF 64 is designed to remove diesel particulate matter called soot from the exhaust gas of the engine 54. When the exhaust gas flows through small passages in the DPF 64 that are made of a ceramic material, the DPF 64 catches the soot exiting the DOC 62. During regeneration, which is explained below in detail, the DPF 64 allows for oxidation of the stored soot when the loading or accumulation level of the soot reaches or exceeds a predetermined level.

The SCR 66 uses a liquid reductant agent (e.g., a urea-based diesel exhaust fluid) that is injected from the DEF 68 into a catalytic converter in the SCR 66 to significantly reduce NOx emissions from the muffler 70.

The DPF 64 requires periodic maintenance to remove soot and ash that builds up in the DPF 64. The soot and ash buildup in the DPF 64 increases the gas pressure upstream from the DPF 64. Warnings are provided to drivers before the restriction of the DPF 64 due to the buildup that can affect the drive-ability of the vehicle, or can damage the engine 54 or the DPF 64. Accordingly, regular maintenance of the DPF 64 is necessary.

DPFs undergo a regeneration process that removes the soot and lowers the upstream pressure on the engine. Depending on the soot level in the DPF 64, passive, active, parked, or forced regeneration process is performed on the DPF 64 by the AFT 50. For example, the regeneration component 80 of the AFT 50 monitors the soot level of the DPF 64 and performs the appropriate regeneration procedure on the DPF 64 under the control of the ECU 52 as follows.

Passive regeneration is automatically performed by the AFT 50 when the soot level in the DPF 64 is relatively low. Passive regeneration occurs normally while driving the vehicle when engine load and vehicle drive-cycle create temperatures that are high enough to burn the soot buildup in the DPF 64. Passive regeneration does not use additional fuel and does not affect vehicle performance. The vehicle can be driven at regular speeds at rated fuel efficiency when the soot level is relatively low.

Active regeneration is also automatically performed by the AFT 50 when the soot level in the DPF 64 is relatively low. Active regeneration occurs while the vehicle is driven when low engine load and lower exhaust gas temperatures inhibit the naturally occurring passive regeneration. Sensors upstream and downstream of the DPF 64 (or a differential pressure sensor) provide data that initiates a metered addition of fuel into the exhaust stream. The fuel can be injected directly into the exhaust stream, downstream from the turbocharger, or into the engine cylinders on an exhaust stroke. The fuel and exhaust gas mixture passes through the DOC 62. A catalytic reaction between the fuel and the precious metals in the DOC 62 creates heat, which raises the temperature in the DOC 62 and the DPF 64, creating temperatures high enough to burn the accumulated soot in the DPF 64.

After the pressure drop across the DPF 64 decreases to a predetermined value, indicating that the soot level in the DPF 64 is very low, the regeneration process ends. The regeneration process is repeated when the soot accumulation rebuilds in the DPF 64. Active regeneration works well for vehicles that are driven over longer distances with fewer stops compared to the vehicles that operate on short trips with many starts and stops.

If the soot building up in the DPF 64 is relatively high but less than a predetermined threshold, the engine 54 may moderately de-rate or lose power. In such a situation, the driver can initiate a parked regeneration via a dashboard mounted switch. Various interlocks and prerequisite conditions must be met for this process to initiate. Examples of the interlocks include whether parking brake is applied, whether the transmission is in neutral, whether the engine coolant temperature is within acceptable range, and whether any engine related fault codes have occurred. If any of the conditions are not satisfied, the parked regeneration cannot be performed. The parked regeneration injects extra fuel and raises the engine RPM to increase exhaust temperatures for the regeneration to occur.

When the soot accumulation in the DPF 64 exceeds the predetermined threshold level that can be potentially damaging to the engine or the exhaust system, the parked regeneration is disabled (i.e., cannot be performed). The engine usually shuts down, and the vehicle cannot be driven. In such a situation, the only option is to move (mostly tow) the vehicle to a service station, where a specialized diagnostic equipment is used by a trained technician to thoroughly test the exhaust system and to perform a forced regeneration. In some cases, the DPF 64 may have to be thoroughly cleaned at the service station before performing a forced regeneration. In the worst case, the DPF 64 may have to be replaced.

The reset tool of the present disclosure allows performing forced regeneration anywhere. The vehicle does not need to be taken to a service station to perform the forced regeneration. The reset tool can be used to perform the forced regeneration at any time. Additionally, the reset tool can reset any fault codes before performing the forced regeneration and can erase any learned data of any of the ECUs 12 (including the ECU 52) before and after performing the forced regeneration. Further, after resetting any of the fault codes, the reset tool can reset any operating parameters of the AFT 50. These and other features of the reset tool are explained below in detail.

Figure 3A:
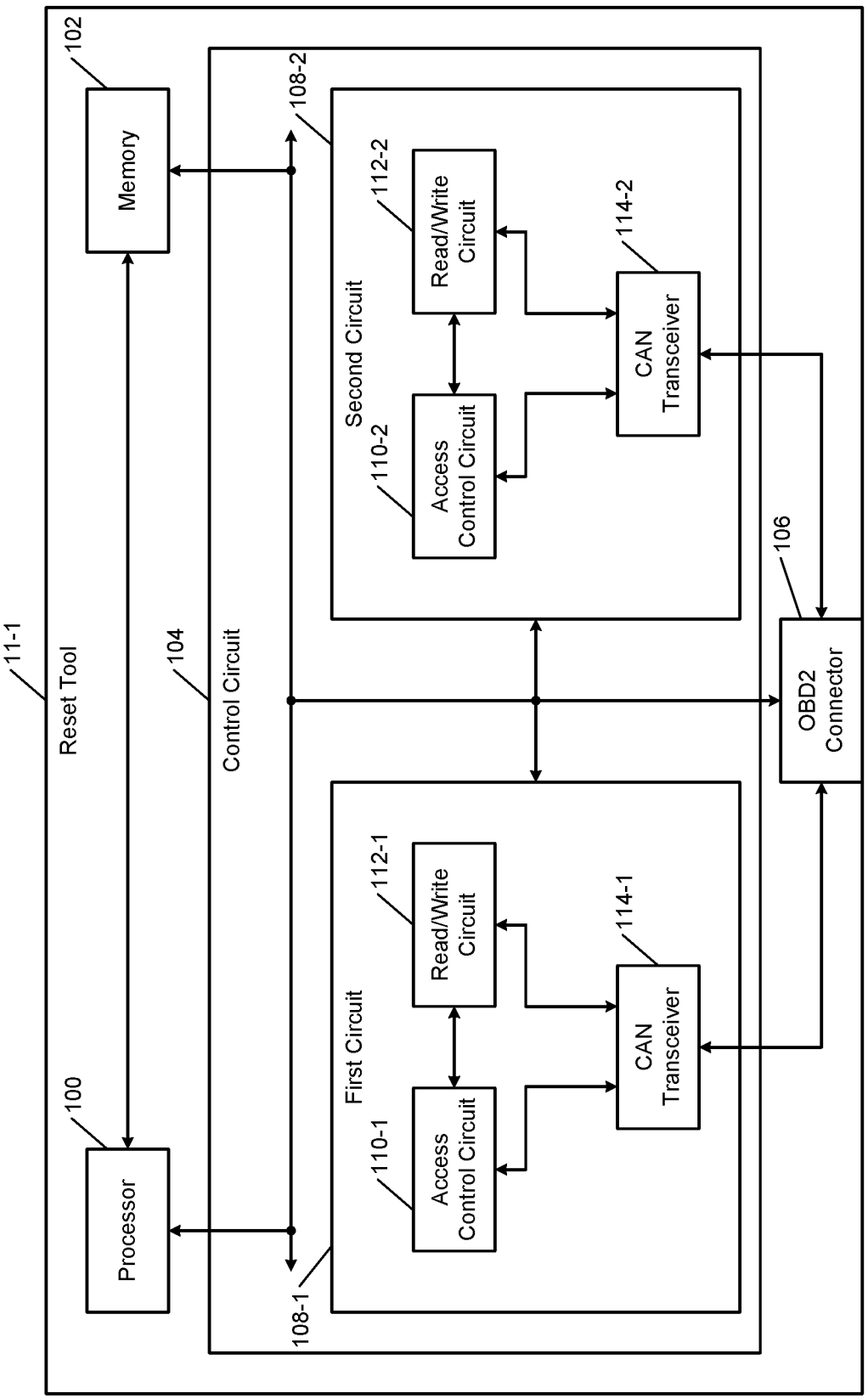
FIGS. 3A and 3B show functional block diagrams of examples of the reset tool.

FIG. 3A shows one example of the computing device (i.e., the reset tool) 11-1 in detail. The reset tool 11-1 comprises a processor 100, memory 102, a control circuit 104, and a connector 106. The connector 106 can connect to a port in the vehicle 10 or 10-1. While only one connector is shown, the reset tool 11-1 may include more than one connector so that the reset tool 11-1 can be connected using different connectors to ports having different types of connectors in different vehicles. The connector 106, when connected to the port in the vehicle 10 or 10-1, connects the reset tool 11-1 to the CAN bus 16 and to a battery of the vehicle 10 or 10-1. Thus, the reset tool 11-1 receives power from the battery of the vehicle 10 or 10-1 via the connector 106.

The control circuit 104 comprises a first circuit 108-1 and a second circuit 108-2. The first circuit 108-1 comprises an access control circuit 110-1, a read write circuit 112-1, and a CAN transceiver 114-1. The second circuit 108-2 comprises an access control circuit 110-2, a read write circuit 112-2, and a CAN transceiver 114-2. The first circuit 108-1 and the second circuit 108-2 may perform functions of the CAN controller 34 described above with reference to FIG. 1A. The CAN transceivers 114-1 and 114-2 may perform functions of the CAN transceiver 22 described above with reference to FIG. 1A.

In some implementations, the first circuit 108-1 and the second circuit 108-2 may not include the CAN transceivers 114-1 and 114-2, respectively. Instead, the control circuit 104 may include a single CAN transceiver such as the CAN transceiver 22 described above with reference to FIG. 1A. The single CAN transceiver may be connected to the connector 106, and each of the first circuit 108-1 and the second circuit 108-2 may communicate with the single CAN transceiver.

The reset tool 11-1 can operate along with the communication system SoC 24, which allows a remote application and/or an app on a mobile device (e.g., of the driver) to communicate with the reset tool 11-1 as explained in various implementations described with reference to FIGS. 8A-14B. The operations performed by the reset tool 11-1 are described in detail with reference to FIGS. 5 and 6A-6C below.

Figure 3B:
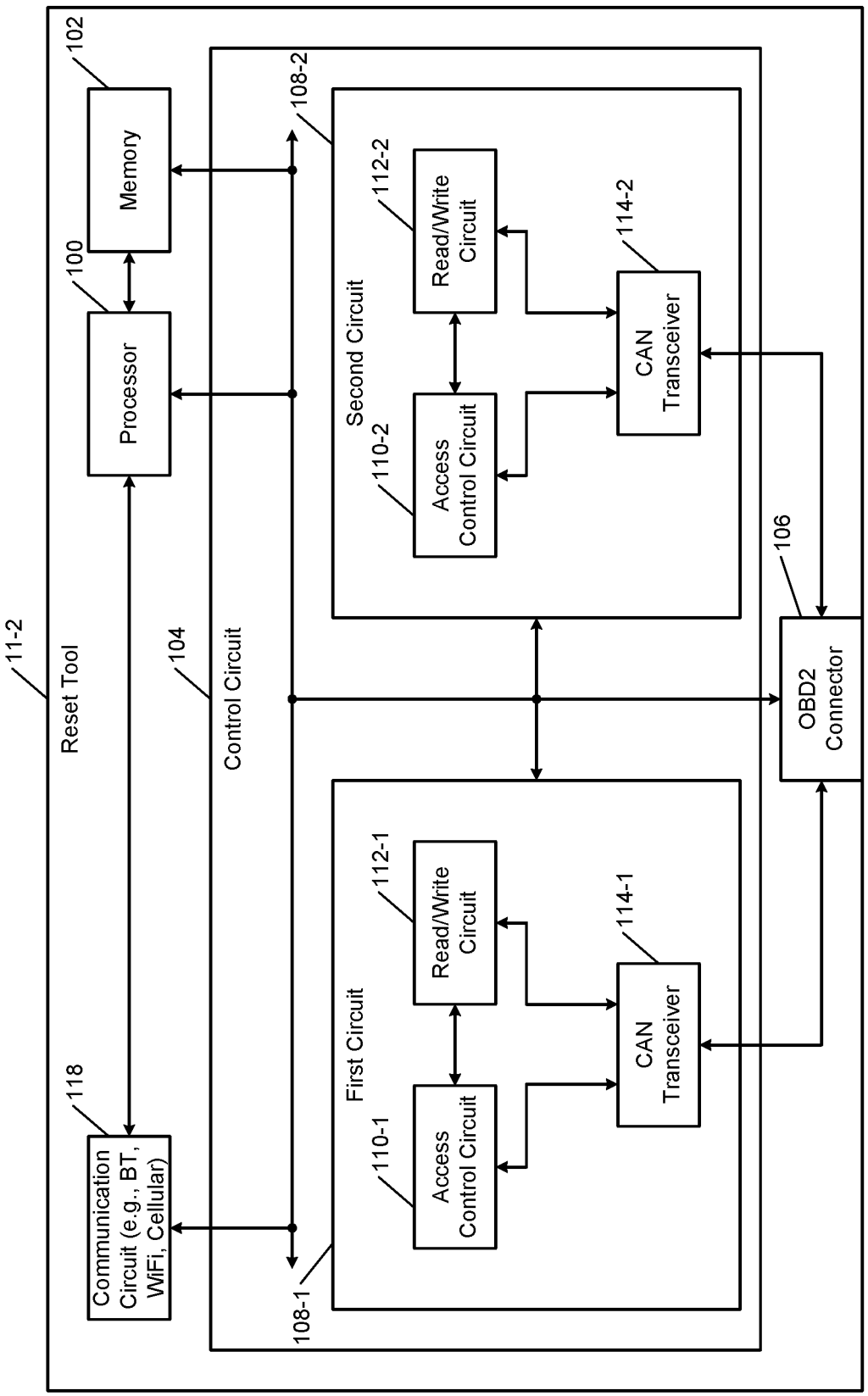

FIG. 3B shows another example of the computing device (i.e., the reset tool) 11-2 in detail. The reset tool 11-2 includes all the elements of the reset tool 11-1 and additionally includes a communication circuit 118. The communication circuit 118 may include a Bluetooth circuit, a cellular circuit, and/or a WiFi circuit. The communication circuit 118 allows a remote application and/or an app on a mobile device (e.g., a smartphone of the driver) to communicate with the reset tool 11-2 as explained in various implementations described with reference to FIGS. 8A-14B. The reset tool 11-2 can operate in a standalone manner without the communication system SoC 24. The operations performed by the reset tool 11-2 are described in detail with reference to FIGS. 5 and 6A-6C below.

In FIGS. 3A and 3B, the first circuit 108-1 or the second circuit 108-2 is used depending on the speed of the CAN bus 16. For example, the processor 100 can query one of the ECUs 12, receive data regarding the type of the CAN bus 16, and determine or learn the speed of the CAN bus 16 from the received data. Alternatively, the processor 100 can transmit and receive data on the CAN bus 16 via one of the CAN transceivers 114 and determine the speed of the CAN bus 16 based on the transmitted and received data. Other methods of determining the speed of the CAN bus 16 may be used. The processor 100 activates the first circuit 108-1 or the second circuit 108-2 depending on the sensed speed of the CAN bus 16. For example, the processor 100 activates the first circuit 108-1 if the speed of the CAN bus 16 is a first speed (e.g., a relatively low speed) or the second circuit 108-1 if the speed of the CAN bus 16 is a second speed (e.g., a relatively high speed). In some implementations, the speed of the CAN bus 16 may not be material (i.e., may be irrelevant). Accordingly, only one circuit (e.g., the first circuit 108-1 or the second circuit 108-2) may be used regardless of the speed of the CAN bus 16. Use of only one circuit comprising an access control circuit 110 and a read write circuit 112 is presumed in the following description.

Figure 4A:
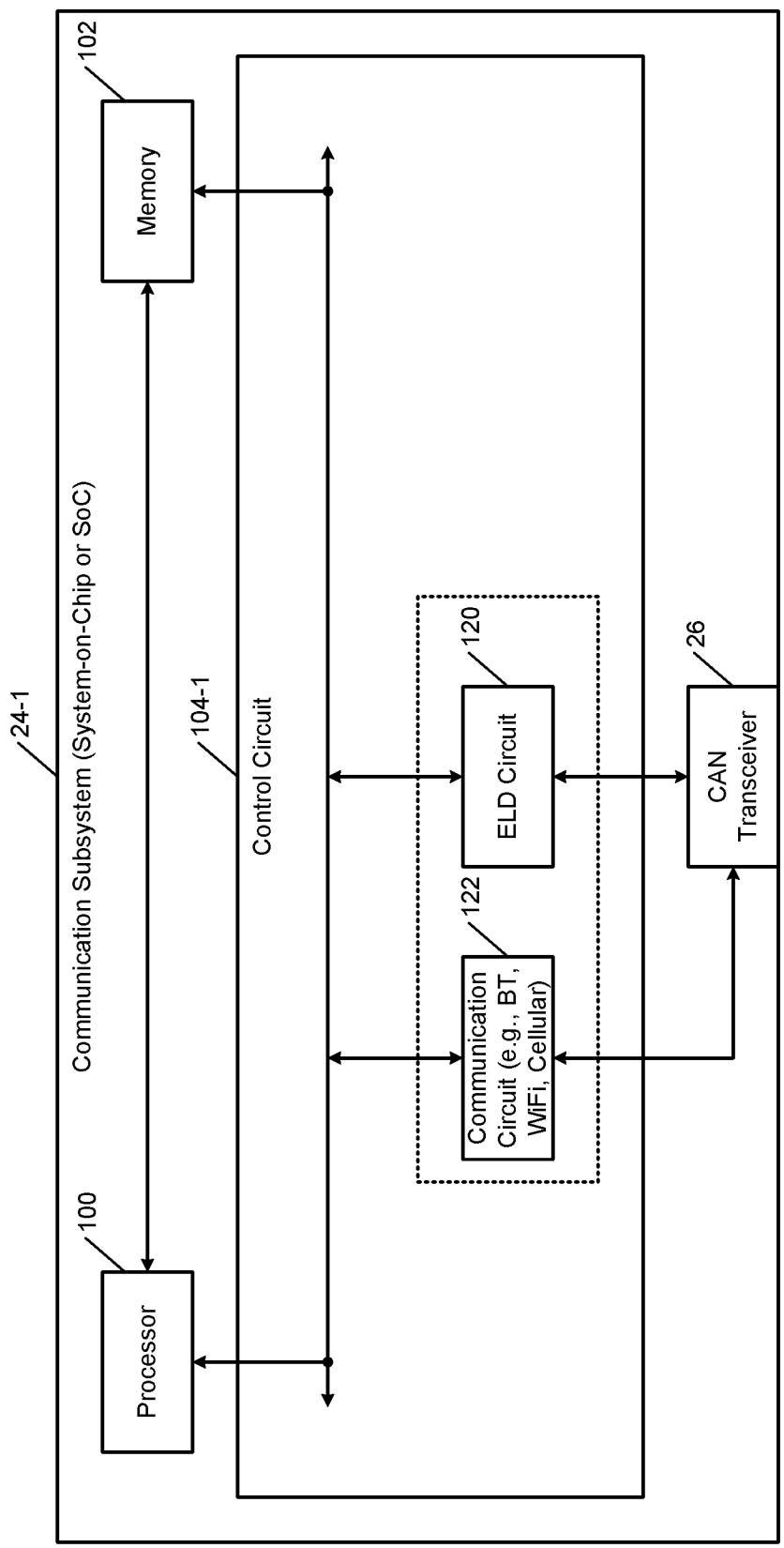
FIGS. 4A-4C show functional block diagrams of examples of the communication subsystem SoC.
Figure 4B:
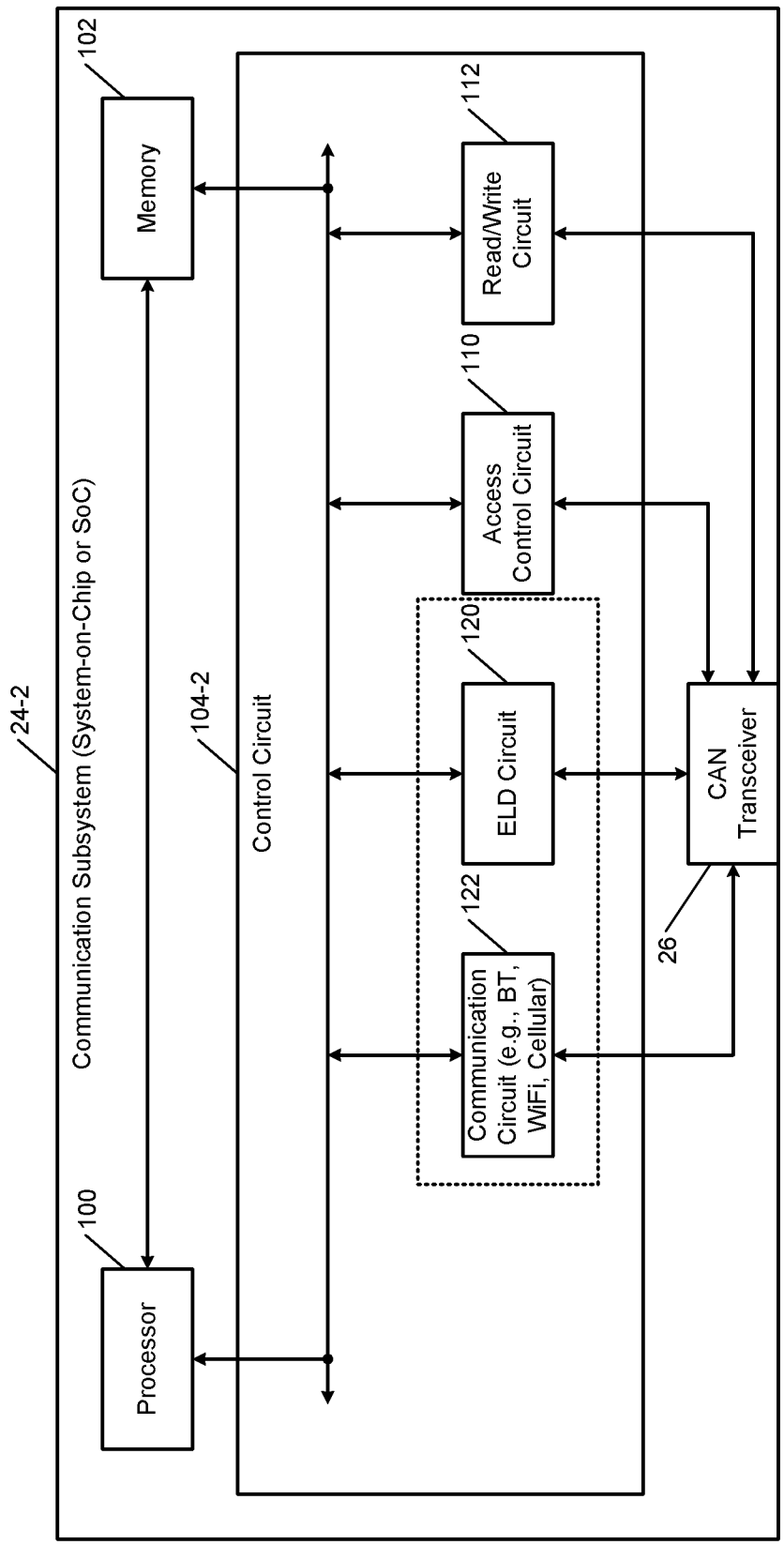
Figure 4C:
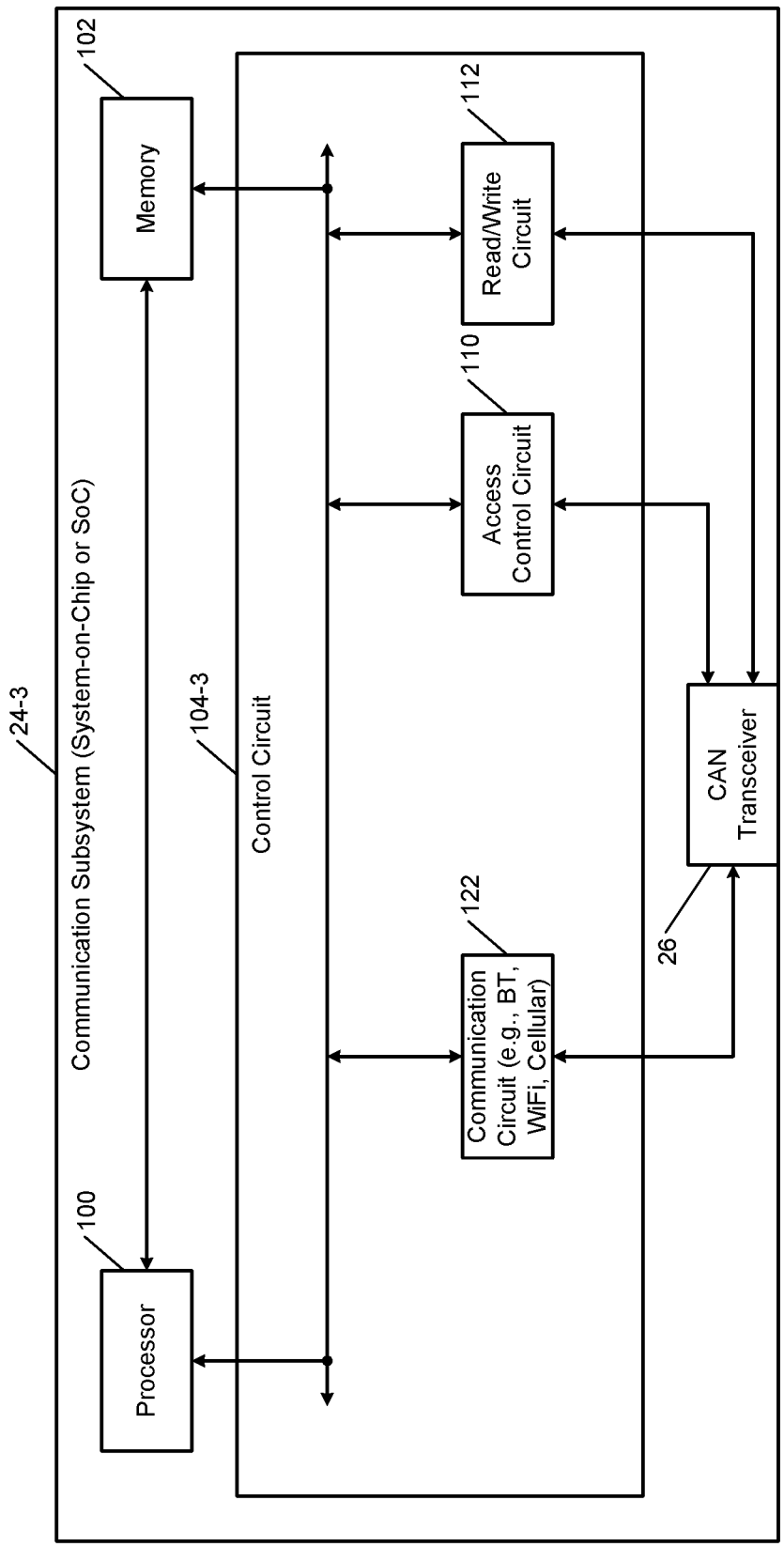

FIGS. 4A-4C examples of the reset tool integrated with the communication system SoC 24. FIG. 4A shows one example of a communication system SoC 24-1. Essentially, the communication system SoC 24-1 includes the processor 100, the memory 102, a control circuit 104-1, and a CAN transceiver 26. The processor 100 and the memory 102 are described with reference to FIG. 3A and are therefore not described again for brevity. The CAN transceiver 26 is similar to the CAN transceiver 22 described with reference to FIGS. 1A and 1s therefore not described again for brevity.

The control circuit 104-1 comprises, for example, an electronic logging device (ELD) 120 and a communication circuit 122. The communication circuit 122 may be included in the ELD 120 and is shown separately for illustrative purposes. The ELD 120 may access some of the subsystems 14 of the vehicle 10, 10-1 via the respective ECUs 12 of the subsystems 14 and log data related to those subsystems 14. A remote application (e.g., a fleet management application) may communicate with the ELD 120 via the communication circuit 122. An application that can initiate the operations performed by the reset tool (hereinafter the tool application) may be integrated or bundled with the remote application. The tool application can access the ECUs 12 through the remote application and the ELD 120 (and/or via a mobile app on a mobile device). The tool application can send commands to the appropriate ECUs 12 to perform the desired operations of the reset tool, which is explained in further detail with reference to some of the FIGS. 8A-14B.

FIG. 4B shows another example of a communication system SoC 24-2. The communication system SoC 24-2 is similar to the communication system SoC 24-1 except that the communication system SoC 24-2 includes a control circuit 104-2 that is different than the control circuit 104-1 of the communication system SoC 24-1. In some cases, the ELD 120 (or another communication subsystem being utilized by the tool application) may not be able access and/or write to some of the ECUs although such access may be necessary for the tool application to perform the operations of the reset tool. Alternatively, the communication system SoC 24 may include a communication chip other than the ELD 120, where the communication chip may communicate with a corresponding remote application but may not be able access and write to some of the ECUs 12, which may be necessary for the tool application to perform the operations of the reset tool.

Accordingly, the control circuit 104-2 may comprise, for example, an electronic logging device (ELD) 120 (or another communication chip) and the communication circuit 122, which are described with reference to FIG. 4A and are therefore not described again for brevity. The control circuit 104-2 additionally comprises the access control circuit 110 and the read/write circuit 112, which are similar to elements 110 and 112 described with reference to FIG. 3A and are therefore not described again for brevity. A remote application may communicate with the ELD 120 (or another communication chip) via the communication circuit 122. The tool application may be integrated or bundled with the remote application. The tool application can access the ECUs 12 through the remote application, the ELD 120, the access control circuit 110, and the read/write circuit 112 (and/or via a mobile app on a mobile device). The tool application can send commands to the appropriate ECUs 12 to perform the desired operations of the reset tool, which is explained in further detail with reference to some of the FIGS. 8A-14B.

FIG. 4C shows another example of a communication system SoC 24-3. The communication system SoC 24-3 differs from the communication system SoC 24-1 and 24-2 in that the communication system SoC 24-2 does not includes a communication chip such as the ELD 120 (or another communication chip). Instead, the communication system SoC 24-3 includes a control circuit 104-3 that includes the communication circuit 122, the access control circuit 110 and the read/write circuit 112, which are described with reference to FIGS. 3A and 4A and are therefore not described again for brevity. In this implementation, the tool application can access the ECUs 12 through the communication circuit 122, the access control circuit 110, and the read/write circuit 112 (and/or via a mobile app on a mobile device). The tool application can send commands to the appropriate ECUs 12 to perform the desired operations of the reset tool, which is explained in further detail with reference to some of the FIGS. 8A-14B.

Figure 5:
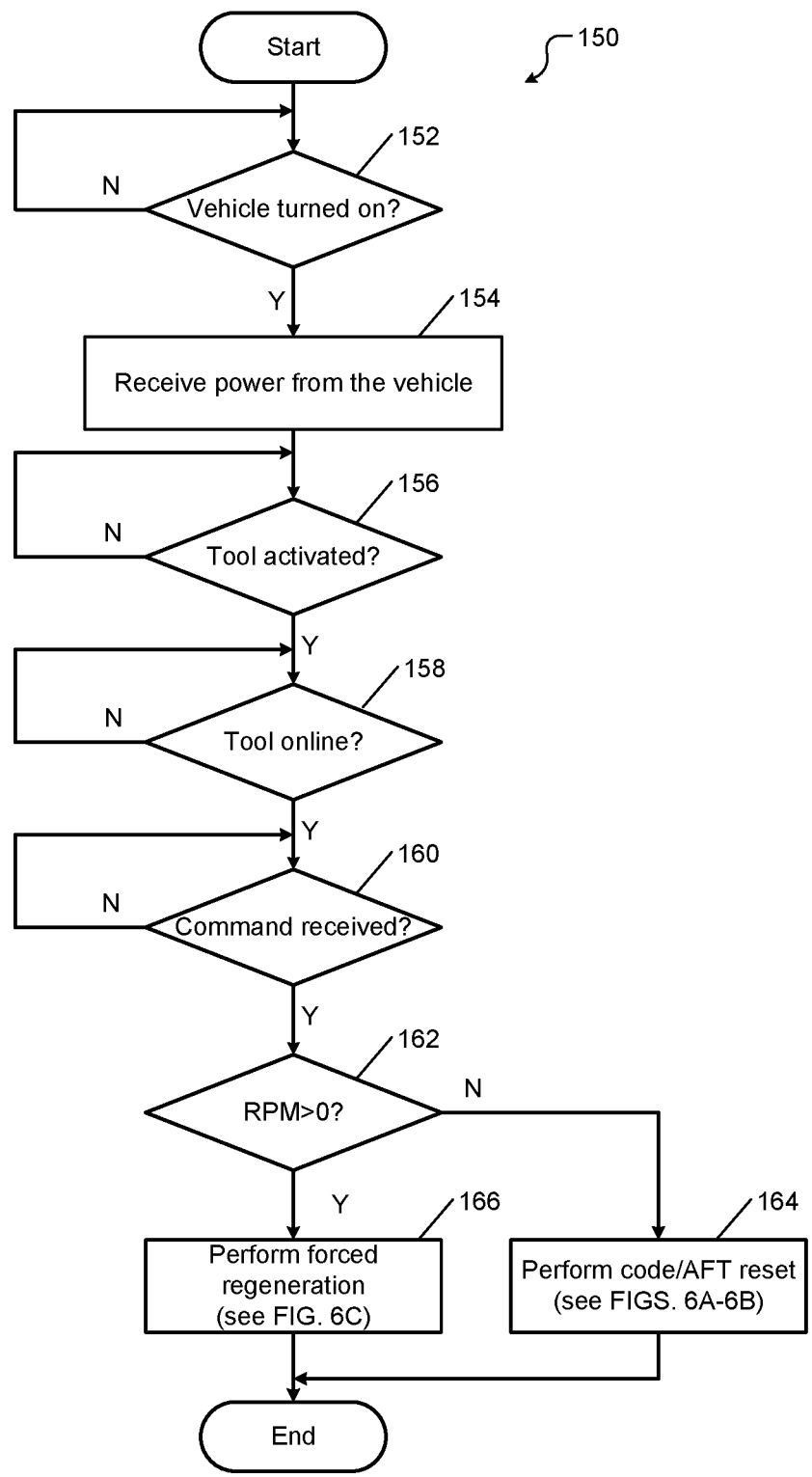
FIG. 5 shows a general flowchart of a method of operations performed by the reset tool and the communication subsystem SoC.
Figure 6A:
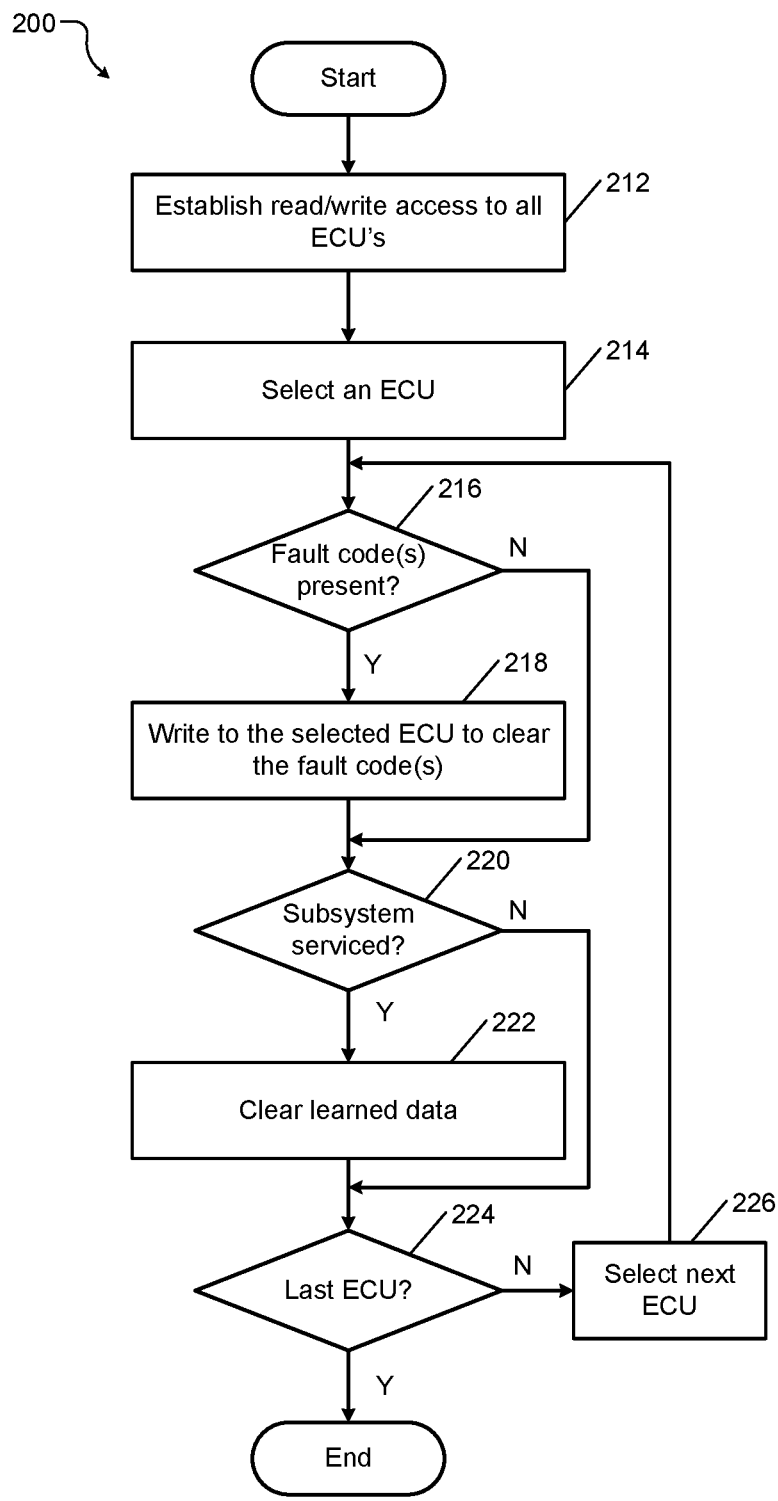
FIGS. 6A-6C show detailed flowcharts of methods of operations performed by the reset tool and the communication subsystem SoC.
Figure 6B:
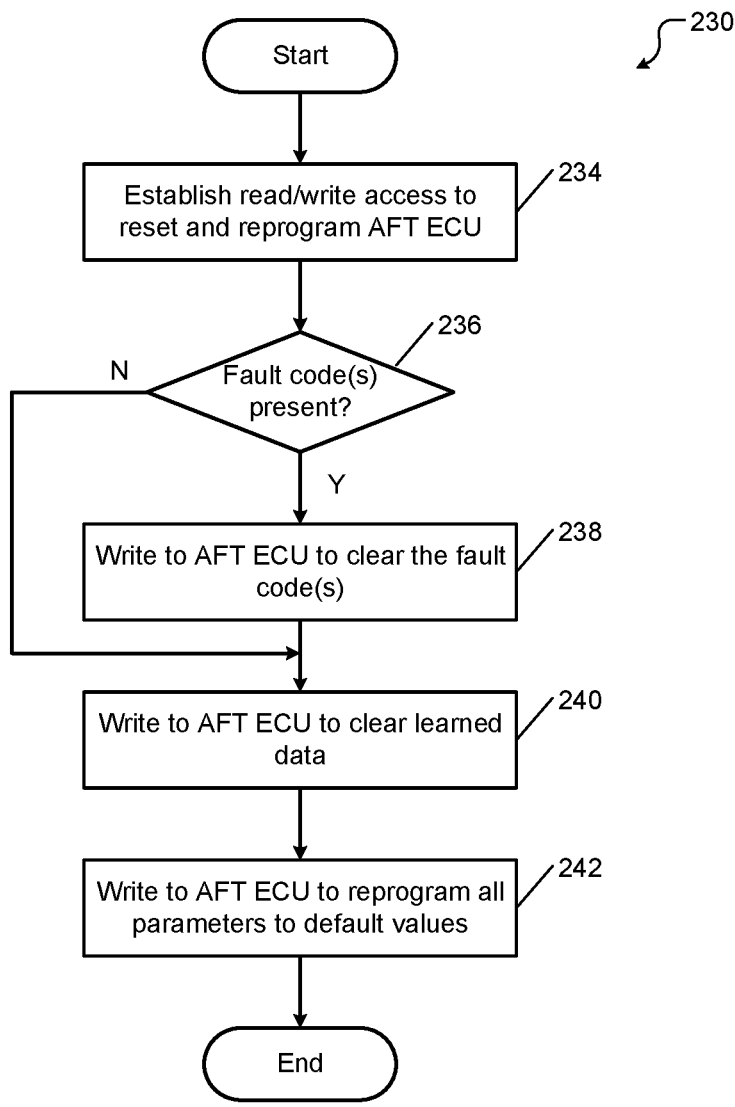
Figure 6C:
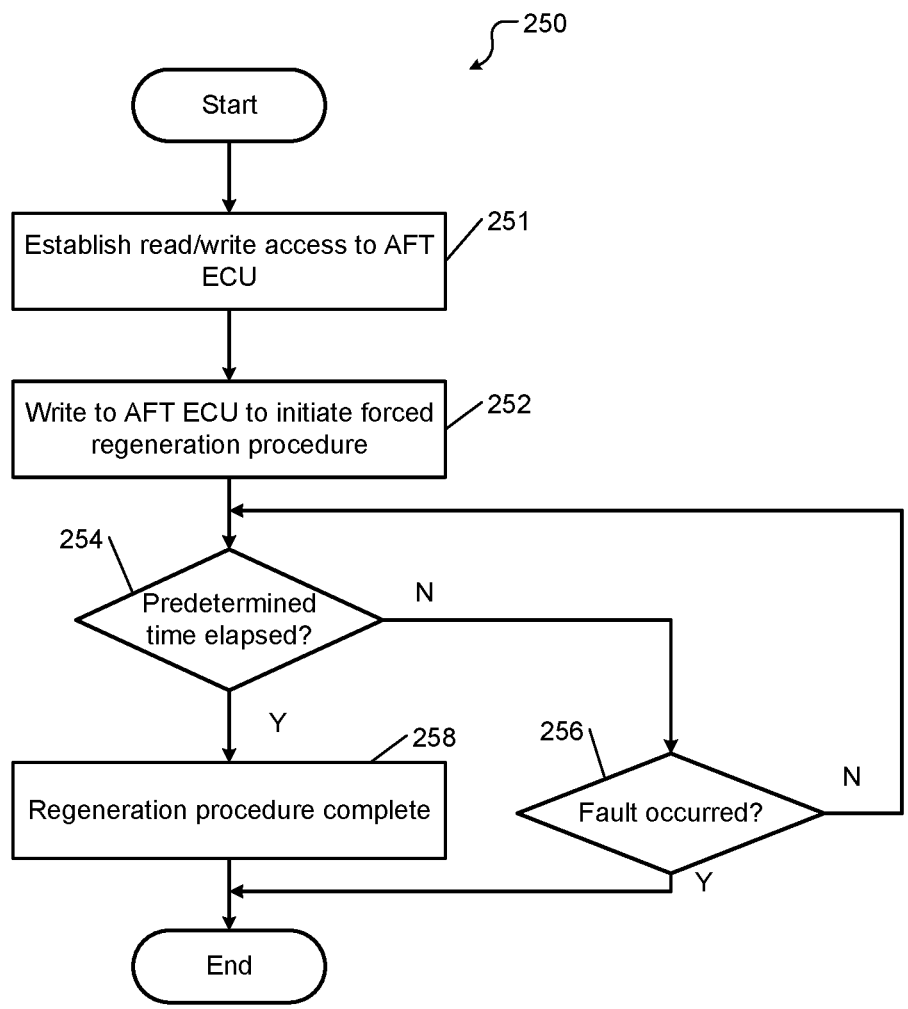

The operations of the reset tool 11-1, 11-2, which can also be performed using the communication system SoC 24-1, 24-2, 24-3 are now described in detail with reference to FIGS. 5 and 6A-6C. FIGS. 5 and 6A-6C show various procedures or methods performed by the reset tool 11 and/or the communication system SoC 24. FIG. 5 shows an overview of the procedures. FIGS. 6A-6C show the procedures in detail. These methods include instructions that are stored in the memory 102 and that are executed by the processor 100 of the reset tool 11, 11-1, 11-2 and of the communication system SoC 24, 24-1, 24-2, 24-3. The instructions, when executed by the processor 100, program the control circuit 104, 104-1, 104-2, 104-3 and cause the control circuit to perform the described functions and operations.

Method Flowcharts

FIG. 5 shows a method 150 performed by the reset tool 11 (i.e., elements 11, 11-1, and 11-2) and/or the communication system SoC 24 (i.e., elements 24, 24-1, 24-2, and 24-3). In the description of FIGS. 5 and 6A-6C, the term reset tool includes the reset tool 11 and/or the communication system SoC 24; the term vehicle includes vehicle 10, 10-1; and the term control circuit 104 includes control circuit 104, 104-1, 104-2, and 104-3. Further, the term control includes the reset tool, a remote application, the tool application, an app on a mobile device, or any combination thereof.

At 152, control determines whether the vehicle is turned on. If the vehicle is turned on, the reset tool receives power from the vehicle at 154. At 156, control determines whether the reset tool is activated (e.g., by receiving a signal from the tool application). If the reset tool is activated, at 158, control determines if the reset tool is online. For example, as explained in further detail with reference to some of the FIGS. 8A-14B, the tool application can perform a secure handshake with the reset tool and determine if the reset tool receives power, has successfully completed power on self-test, is activated, and is ready to receive commands (i.e., there is no fault, and the reset tool is operational and ready to exchange data). If the reset tool is online, at 160, control determines whether the reset tool has received a command (e.g., from the tool application and/or from a mobile app) to perform any of the operations (resetting fault codes, resetting the AFT 50, or regenerating the DPF 64).

It should be understood that determining whether the reset tool is activated and whether the reset tool is online need not be distinct operations and can be combined into one operation. In some implementations, these operations can be omitted, and a command to perform any of the operations can be sent to the reset tool, presuming that the reset tool is activated and is online.

At 162, control determines whether the vehicle is parked and whether the engine is running (i.e., if the vehicle speed is zero and if the engine RPM is greater than zero). For example, control can transmit a query to an engine ECU 12 and obtain the RPM data from the engine ECU 12. Alternatively, control can sniff (sense) the CAN bus 16 to obtain the RPM data of the engine of the vehicle. If the vehicle speed is zero and if the engine RPM is zero, at 164, control performs a procedure to reset fault codes associated with any of the ECUs 12 of the vehicle as shown and described below in detail with reference to FIG. 6A or a procedure to reset the AFT 50 as shown and described below in detail with reference to FIG. 6B. If the vehicle speed is zero and if the engine RPM is greater than zero, at 166, control executes instructions to perform a forced regeneration of the DPF 64 as shown and described below in detail with reference to FIG. 6C.

After the end of any procedure (e.g., resetting fault codes of the ECUs 12, resetting the AFT 50, or regeneration of the DPF 64), the driver can begin driving the vehicle. If a fault code recurs, control repeats the above process or schedules service for the vehicle. This way, the driver is not stranded on the road and does not have to tow the vehicle to a service center. Throughout the present disclosure, it is presumed that vehicle and/or the tool application has the ability (e.g., via the reset tool in the vehicle) to detect an event (e.g., a fault code, soot level, etc.), which triggers the tool application to initiate one or more operations of the reset tool in the vehicle.

In some situations, the driver or the tool application (e.g., using an app on the driver's mobile device) may elect to perform a forced regeneration of the DPF 64. For example, the driver may have replaced a component of the AFT 50, and may want to or need to perform a forced regeneration of the DPF 64. Alternatively, the AFT 50 may be providing a warning or a fault code regarding the soot level of the DPF 64 on the dashboard of the vehicle, and/or the engine of the vehicle may be de-rating. If a fault code regarding the soot level of the DPF 64 is being displayed on the dashboard of the vehicle, depending on the severity of the soot level indicated by the fault code, before performing the forced regeneration, the driver or the tool application (e.g., using an app on the driver's mobile device) may perform the fault code reset procedure to see if the fault code disappears. The driver or the tool application (e.g., using an app on the driver's mobile device) may also perform the AFT reset procedure before performing the forced regeneration. If resetting the fault codes and resetting the AFT 50 do not solve the problem, the driver or the tool application (e.g., using an app on the driver's mobile device) may also attempt to perform a parked regeneration. If the parked regeneration is disabled (i.e., cannot be initiated) because the soot level in the DPF is extremely high, performing forced regeneration is the only option available to the driver.

To initiate the forced regeneration procedure, the driver stops the vehicle, turns off the ignition, and engages the parking brake. Then the driver turns on the ignition, starts the engine, and allows the engine to idle. (If the reset tool is portable and not connected to the vehicle, the driver connects the reset tool to the vehicle.) The reset tool powers up using power from the battery of the vehicle. The tool application (e.g., using an app on the driver's mobile device) checks the engine RPM and vehicle speed through the reset tool. Since the engine RPM is not zero and the vehicle speed is zero, the tool application (e.g., using an app on the driver's mobile device) sends a command to the reset tool to execute the forced regeneration procedure. During the forced regeneration procedure, the engine RPM increases, the temperature of the AFT 50 increases, and the soot in the DPF 64 is burned in about 30-60 minutes. Thereafter, the engine idles for a period of time to allow the DPF 64 to cool down, and then the driver can begin driving the vehicle. This way, the driver is not stranded on the road and does not have to tow the vehicle to a service center.

FIGS. 6A-6C respectively show methods 200, 230, 250 performed by the reset tool to reset fault codes of the ECUs 12, reset the AFT 50, and perform regeneration of the DPF 64. In FIG. 6A, at 212, control establishes read/write access to all the ECUs 12. For example, control performs an authentication procedure (e.g., a security handshake) with one or more of the ECUs 12 and gains read/write access to all the ECUs 12.

At 214, control selects a first one of the ECUs 12. At 216, control accesses the selected ECU 12 and determines if any fault code is present in the selected ECU 12. Control proceeds to element to 220 if a fault code is not present in the selected ECU 12. If a fault code is present in the selected ECU 12, at 218, control writes to an appropriate register in the selected ECU 12, which causes the selected ECU 12 to clear the fault code. For example, control may transmit a command that, when written into the selected ECU 12, initiates a procedure or subroutine to clear the fault code. Other methods of clearing the fault codes may be used.

At 220, control determines whether the subsystem 14 controlled by the selected ECU 12 has been serviced, which would require clearing any data learned by the ECU 12 prior to the servicing. For example, control can obtain this information by reading a register in the selected ECU 12. Control proceeds to element 224 if the subsystem 14 controlled by the selected ECU 12 has not been serviced, and clearing the learned data is unnecessary.

If the subsystem 14 controlled by the selected ECU 12 has been serviced, and clearing the learned data is necessary, at 222, control writes to an appropriate register in the selected ECU 12, which causes the selected ECU 12 to clear the learned data. For example, control may transmit a command that, when written into the selected ECU 12, initiates a procedure or subroutine to clear the learned data. Other methods for clearing the learned data may be used.

At 224, control determines whether the selected ECU 12 is the last one of the ECUs 12 (i.e., whether all the ECUs 12 have been checked for fault codes). If the selected ECU 12 is not the last one of the ECUs 12 (i.e., if all the ECUs 12 have not been checked for fault codes), at 226, control selects the next one of the ECUs 12, and control returns to 216. In some implementations, control does not read fault codes; rather, control simply clears the fault codes. Further, in some implementations, control may clear only detected or reported fault code or codes. That is, control may not check all the ECUs 12 for presence or absence of fault codes.

In FIG. 6B, at 234, control establishes read/write access to reset and reprogram the ECU 52, which is one of the ECUs 12 controlling the AFT 50 as explained above with reference to FIG. 2. For example, control performs an authentication procedure (e.g., a security handshake) with the ECU 52 and gains read/write access to the ECU 52. Alternatively, control performs an authentication (e.g., a security handshake) procedure with multiple ECUs if more than one ECU is used to control multiple components of the AFT 50 and gains read/write access to the multiple ECUs controlling the multiple components of the AFT 50.

At 236, control accesses the ECU 52 (or the multiple ECUs controlling the multiple components of the AFT 50) and determines if any fault code(s) are present in the ECU 52 (or the multiple ECUs controlling the multiple components of the AFT 50). Control proceeds to element to 240 if any fault code(s) are not present in the ECU 52 (or the multiple ECUs controlling the multiple components of the AFT 50).

If any fault code(s) are present in the ECU 52 (or the multiple ECUs controlling the multiple components of the AFT 50), at 238, control writes to an appropriate register in the ECU 52 (or the multiple ECUs controlling the multiple components of the AFT 50), which causes the ECU 52 (or the multiple ECUs controlling the multiple components of the AFT 50) to clear the fault code(s). For example, control may transmit a command that, when written into the ECU 52 (or the multiple ECUs controlling the multiple components of the AFT 50), initiates a procedure or subroutine to clear the fault code(s). Other methods of clearing the fault codes may be used.

At 240, regardless of whether any component of the AFT 50 has been serviced, control writes to an appropriate register in the ECU 52 (or the multiple ECUs controlling the multiple components of the AFT 50), which causes the ECU 52 (or the multiple ECUs controlling the multiple components of the AFT 50) to clear any learned data stored in the ECU 52 (or the multiple ECUs controlling the multiple components of the AFT 50). For example, control may transmit a command that, when written into the ECU 52 (or the multiple ECUs controlling the multiple components of the AFT 50), initiates a procedure or subroutine to clear the learned data. Other methods for clearing the learned data may be used.

At 242, control writes to an appropriate register in the ECU 52 (or the multiple ECUs controlling the multiple components of the AFT 50), which causes the ECU 52 (or the multiple ECUs controlling the multiple components of the AFT 50) to reprogram all parameters to default values. The reprogramming of all the parameters associated with the AFT 50 to default values is called resetting the AFT 50. Subsequently, control ends. Examples of parameters follow.

For example, resetting the AFT 50 clears issues related to soot level, ash level, ash accumulation, SCR accumulation, SCR NOx poisoning level, engine learned data, AFT learned data, DPF zone level, NOx sensor data, and DPF regeneration timers. This list is not exhaustive. The soot level includes measurement of soot in the DPF 64. The ash level includes measurement of ash in the DPF 64. The SCR accumulation includes measurement of accumulation in the SCR component 66. The SCR NOx poisoning level includes measurement of NOx efficiency and efficiency of the SCR component 66. This is controlled by various measurements configured by the AFT 50. The engine learned data includes data learned from various engine components to adjust injection timing based on characteristics of engine sensor values. Examples include data learned from EGR mass air flow sensor, boost pressure sensor, MAP pressure sensor, and NOx Sensor. The AFT learned data includes measurements of regeneration operation and sensor values. Examples include data learned from DPF temperature sensors, DPF pressure sensors, and NOx sensors. The DPF zone level includes DPF status or zone level status. This is also an alternative to DPF soot load that is calculate by the ECU 52. The NOx sensor data includes data learned from NOx sensors. The DPF regeneration timers store measurement of time since the last DPF regeneration occurred. This is calculated based on time, miles driven, fuel usage.

In FIG. 6C, at 251, control establishes read/write access with the ECU 52, which is one of the ECU 12 controlling the AFT 50 as explained above with reference to FIG. 2. For example, control performs an authentication procedure (e.g., a security handshake) with the ECU 52 and gains read/write access to the ECU 52. Alternatively, control performs an authentication (e.g., a security handshake) procedure with multiple ECUs if more than one ECU is used to control multiple components of the AFT 50 and gains read/write access to the multiple ECUs controlling the multiple components of the AFT 50.

At 252, control executes instructions that cause the ECU 52 (or an ECU controlling the DPF 64) to send a command to the AFT 50 to initiate a forced regeneration of the DPF 64 in the AFT 50. For example, control writes to an appropriate register in the ECU 52 (or an ECU controlling the DPF 64), which causes the ECU 52 (or an ECU controlling the DPF 64) to start a forced regeneration procedure. For example, the procedure includes increasing fuel supply to the AFT 50, raising the engine RPM, and raising the temperature of the DPF 64 to burn off the soot in the DPF 64. Control also starts a timer.

At 254, control checks the timer and determines whether a predetermined time (e.g., about 1 hour) has elapsed. The predetermined time is calculated based on the ECU's (52) request to regenerate the system (50). The forced regeneration procedure can take anywhere from 30 to 90 minutes. The engine RPM reduces to idle RPM once the forced regeneration procedure completed. The engine ECU or the ECU 52 that controls the AFT 50 determines this amount of time to allow enough time to burn off the soot in the AFT 50. Control waits until the predetermined time elapses. This provides the AFT 50 and the ECU 52 (or an ECU such as the engine ECU controlling the DPF 64) sufficient time to regenerate the DPF 64.

At 256, if the predetermined time has not yet elapsed, control determines if a fault has occurred during the forced regeneration procedure. Control ends if a fault occurs during the forced regeneration procedure. Control returns to element 254 if no fault occurs during the forced regeneration procedure. Control continues until the forced regeneration procedure completes or aborts due to a fault. If no fault occurs during the forced regeneration procedure, at 258, the forced regeneration procedure is complete after the predetermined time has elapsed, and control ends. The engine RPM decreases to idle RPM, and the temperature of the DPF 64 decreases. At this point, the vehicle is drivable.

Environment

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 7A:
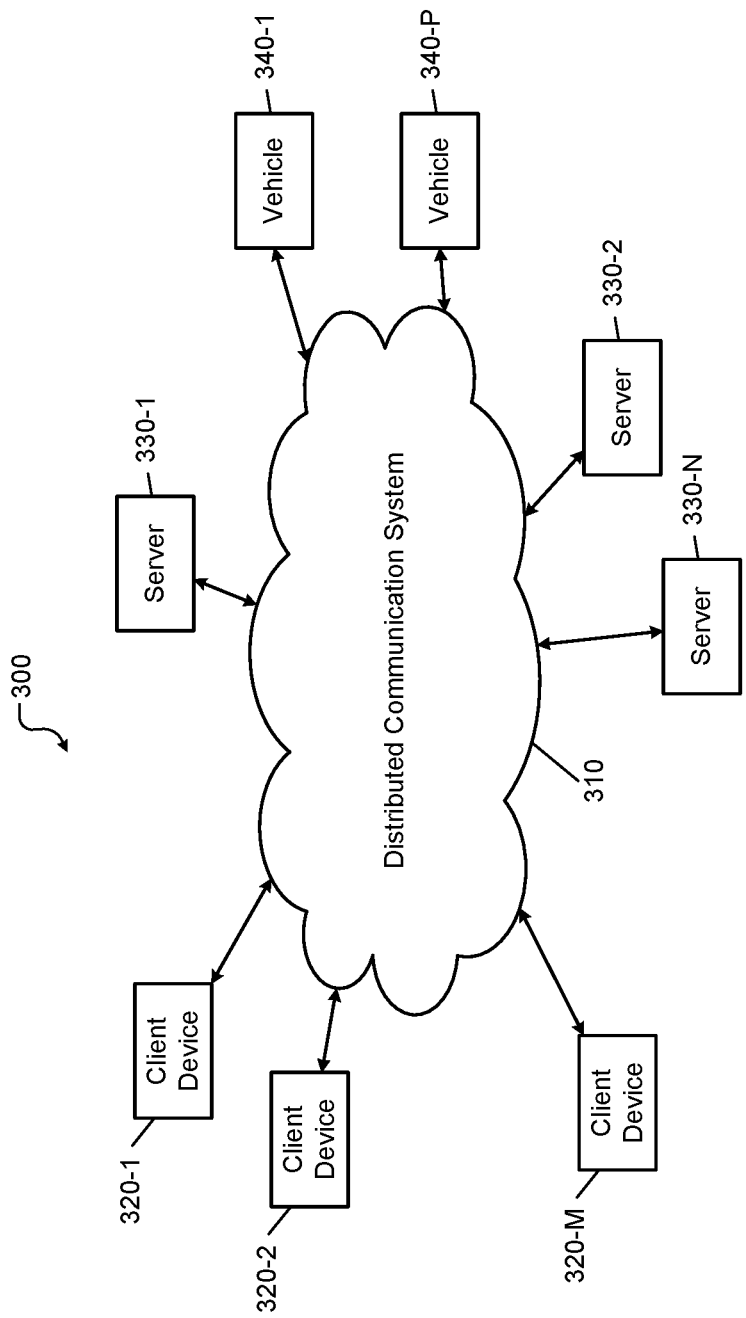
FIG. 7A shows a simplified example of a distributed computing system that can implement the systems and methods shown in FIGS. 1A-6C and 8A-14B.

FIG. 7A shows a simplified example of a distributed computing system 300. The distributed computing system 300 includes a distributed communications system 310; one or more client devices 320-1, 320-2, . . . , and 320-M (collectively, client devices 320); one or more servers 330-1, 330-2, . . . , and 330-N (collectively, servers 330); and one or more vehicles 340-1, 240-2, . . . , and 340-P (collectively, vehicles 340). M, N, and P are positive integers. The distributed communications system 310 may include a local area network (LAN), a wide area network (WAN) such as the Internet, a cellular network, or other type of network. The client devices 320 and the servers 330 may be located at different geographical locations and communicate with each other via the distributed communications system 310. The client devices 320 and the servers 330 connect to the distributed communications system 310 using wireless and/or wired connections. The vehicles 340 are similar to the vehicles 10, 10-1 shown in FIGS. 1A and 1B. The client devices 320 and the servers 330 cam communicate with the vehicles 340 via the distributed communications system 310.

The client devices 320 may include smartphones, personal digital assistants (PDAs), tablets, laptop computers, personal computers (PCs), etc. The servers 330 may provide multiple services to the client devices 320. For example, the servers 330 may execute software applications developed by one or more vendors. The servers 330 may host multiple databases that are relied on by the software applications in providing services to users of the client devices 320.

In some examples, one or more of the servers 330 execute the remote application and/or the tool application described herein. For example, one or more of the servers 330 may be implemented in a cloud. For example, the remote application and/or the tool application may be implemented as software-as-a-service (SaaS). In some examples, one or more of the client devices 320 execute the mobile application (app) described herein.

Figure 7B:
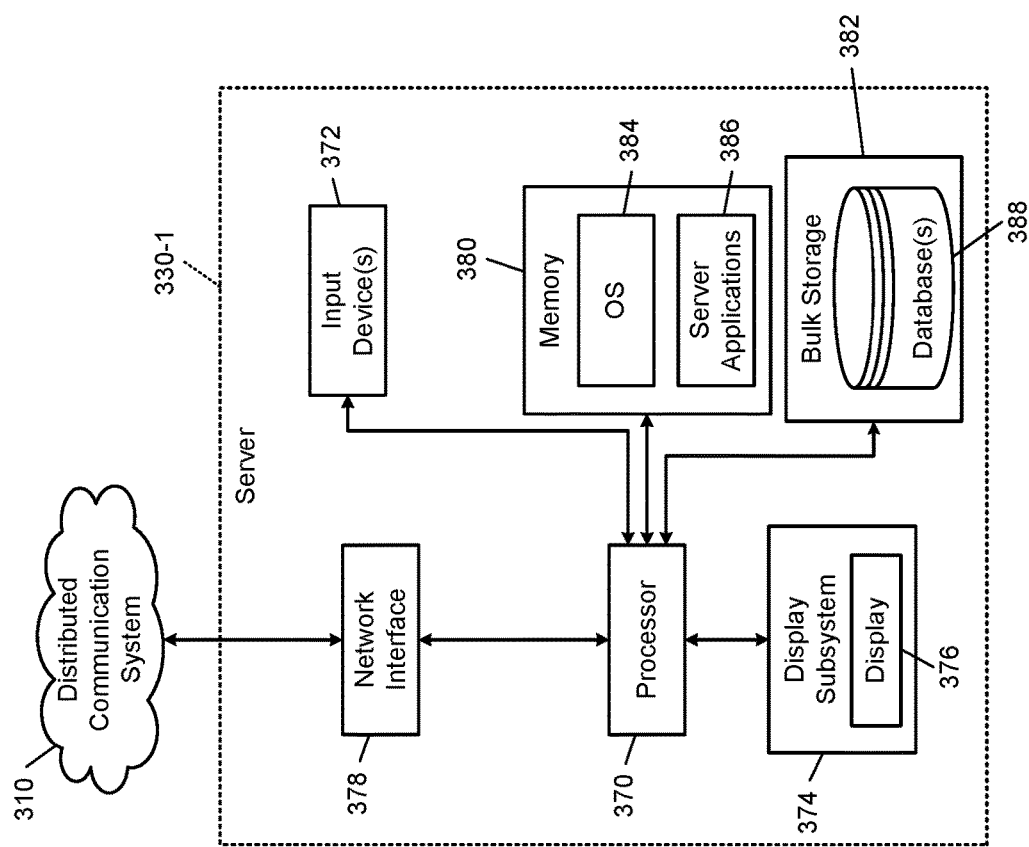
FIG. 7B shows a simplified example of a client device of FIG. 7A.
Figure 7C:
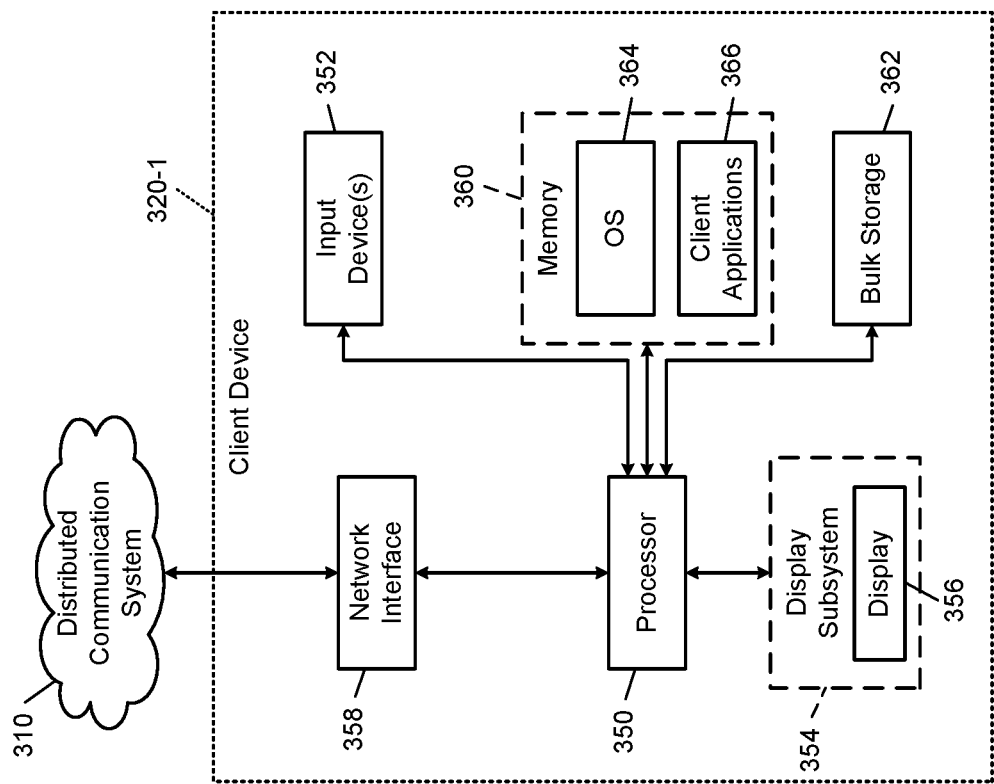
FIG. 7C shows a simplified example of a server of FIG. 7B.

FIG. 7C shows a simplified example of the client device 320-1. The client device 320-1 may typically include a central processing unit (CPU) or processor 350, one or more input devices 352 (e.g., a keypad, touchpad, mouse, touchscreen, etc.), a display subsystem 354 including a display 356, a network interface 358, memory 360, and bulk storage 362.

The network interface 358 connects the client device 320-1 to the distributed computing system 300 via the distributed communications system 310. For example, the network interface 358 may include a wired interface (for example, an Ethernet interface) and/or a wireless interface (for example, a Wi-Fi, Bluetooth, cellular, near field communication (NFC), or other wireless interface). The memory 360 may include volatile or nonvolatile memory, cache, or other type of memory. The bulk storage 362 may include flash memory, a magnetic hard disk drive (HDD), and other bulk storage devices.

The processor 350 of the client device 320-1 executes an operating system (OS) 364 and one or more client applications 366. The client applications 366 include an application that accesses the servers 330 via the distributed communications system 310. In addition, the client applications 366 include the mobile application (app) described herein.

FIG. 7B shows a simplified example of the server 330-1. The server 330-1 typically includes one or more CPUs or processors 370, a network interface 378, memory 380, and bulk storage 382. In some implementations, the server 330-1 may be a general-purpose server and include one or more input devices 372 (e.g., a keypad, touchpad, mouse, and so on) and a display subsystem 374 including a display 376.

The network interface 378 connects the server 330-1 to the distributed communications system 310. For example, the network interface 378 may include a wired interface (e.g., an Ethernet interface) and/or a wireless interface (e.g., a Wi-Fi, Bluetooth, cellular, near field communication (NFC), or other wireless interface). The memory 380 may include volatile or nonvolatile memory, cache, or other type of memory. The bulk storage 382 may include flash memory, one or more magnetic hard disk drives (HDDs), or other bulk storage devices.

The processor 370 of the server 330-1 executes an operating system (OS) 384 and one or more server applications 386, which may be housed in a virtual machine hypervisor or containerized architecture, which includes the remote application and/or the tool application. The bulk storage 382 may store one or more databases 388 that store data structures used by the server applications 386 to perform respective functions.

Implementations

FIGS. 8A-14B show various ways of implementing the systems and methods of the present disclosure described above. In FIGS. 8A-14B, the term control includes the remote application, the tool application, an app on a mobile device, the reset tool (e.g., the processor 100 or the control circuit 104), or any combination thereof. Further, in FIGS. 8A-14B, the mobile device (e.g., a smartphone of the driver of the vehicle) may be implemented by a client device 320-1 shown in FIG. 7A.

Figure 8A:
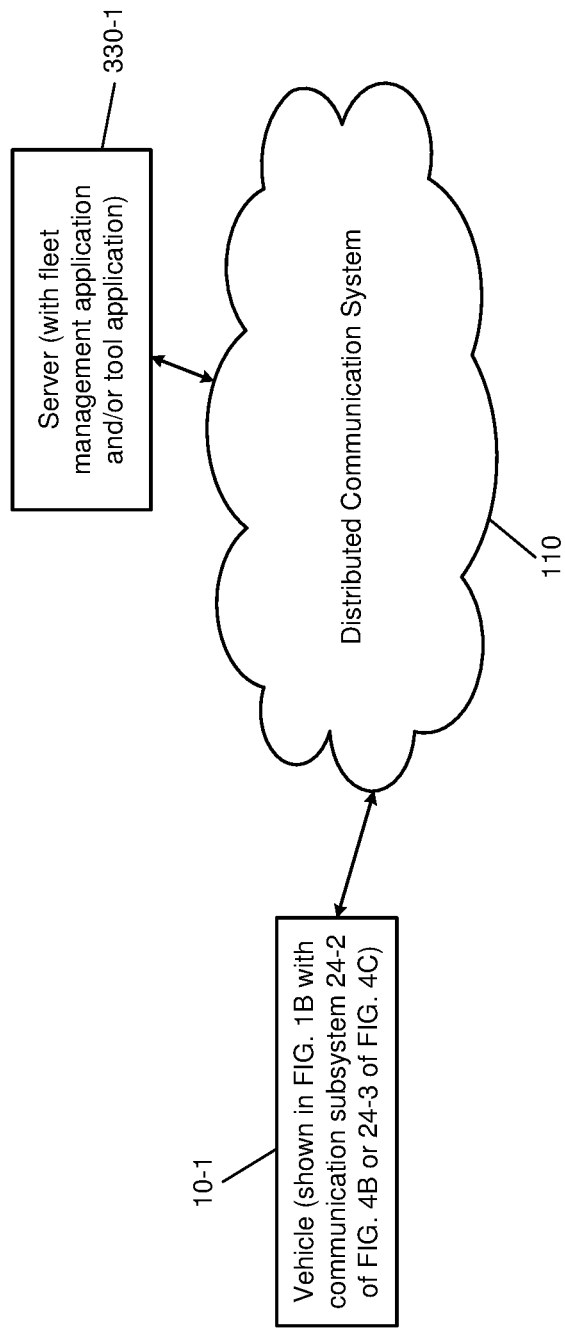

FIGS. 8A-9B show one way of implementing the systems and methods of the present disclosure described above. In this implementation, as shown in FIGS. 8A and 9A, the reset tool may be embedded in a pre-existing communication chip (e.g., element 24-2 comprising the ELD 120 shown in FIG. 4B) or in a customized communication chip (e.g., element 24-3 shown in FIG. 4C) of a vehicle (e.g., element 10-1 shown in FIG. 1B). A server (e.g., element 330-1 shown in FIGS. 7A, 8A, and 9A) may execute the tool application alone or in combination with a remote application associated with the pre-existing communication chip (e.g., a fleet management application).

Figure 8B:
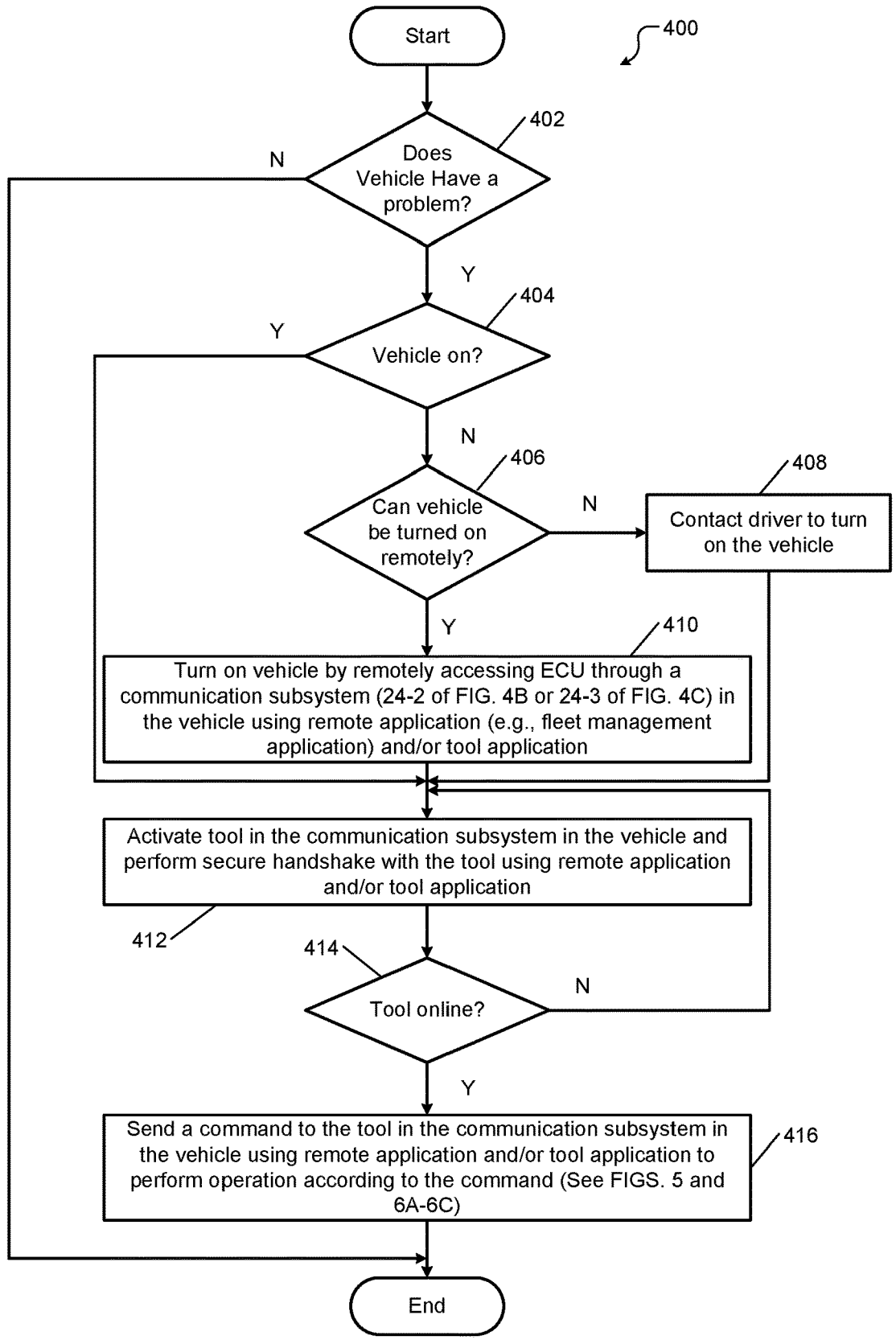
Figure 9A:
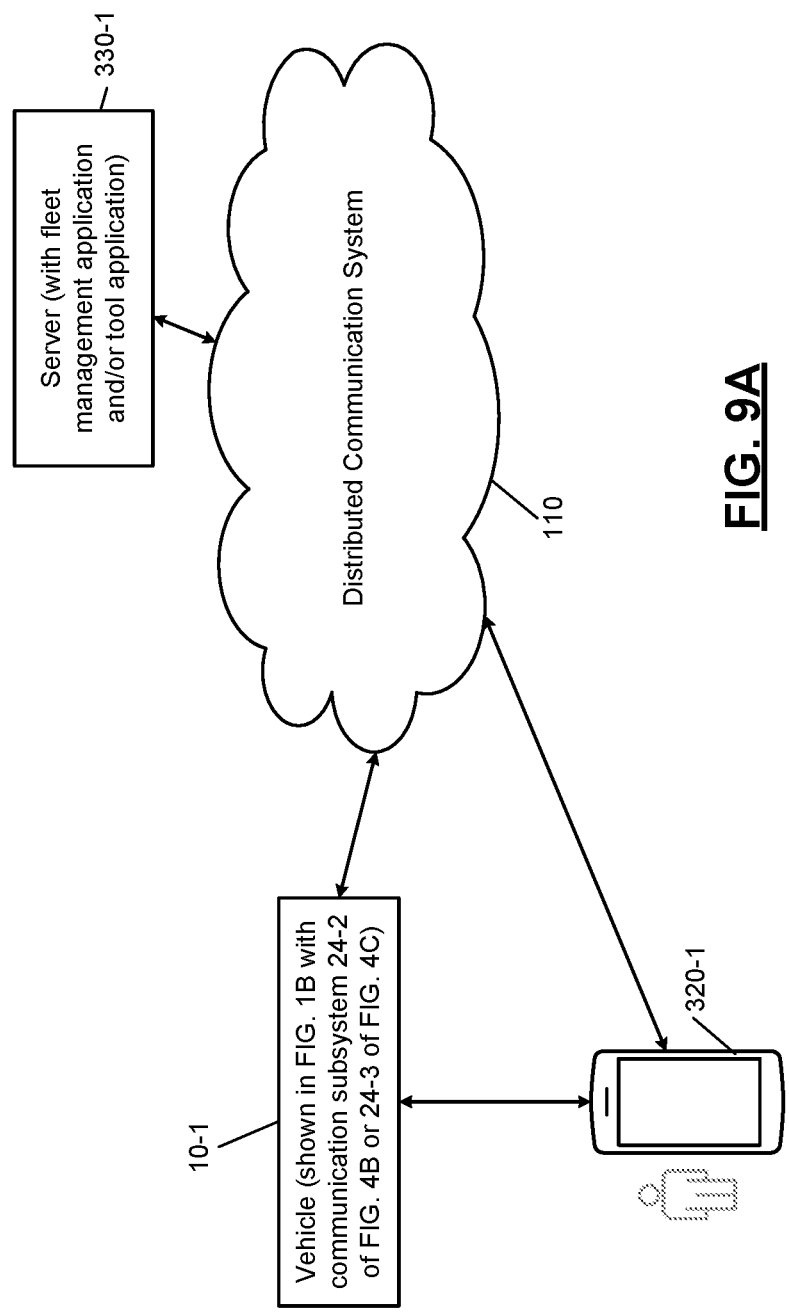
Figure 9B:
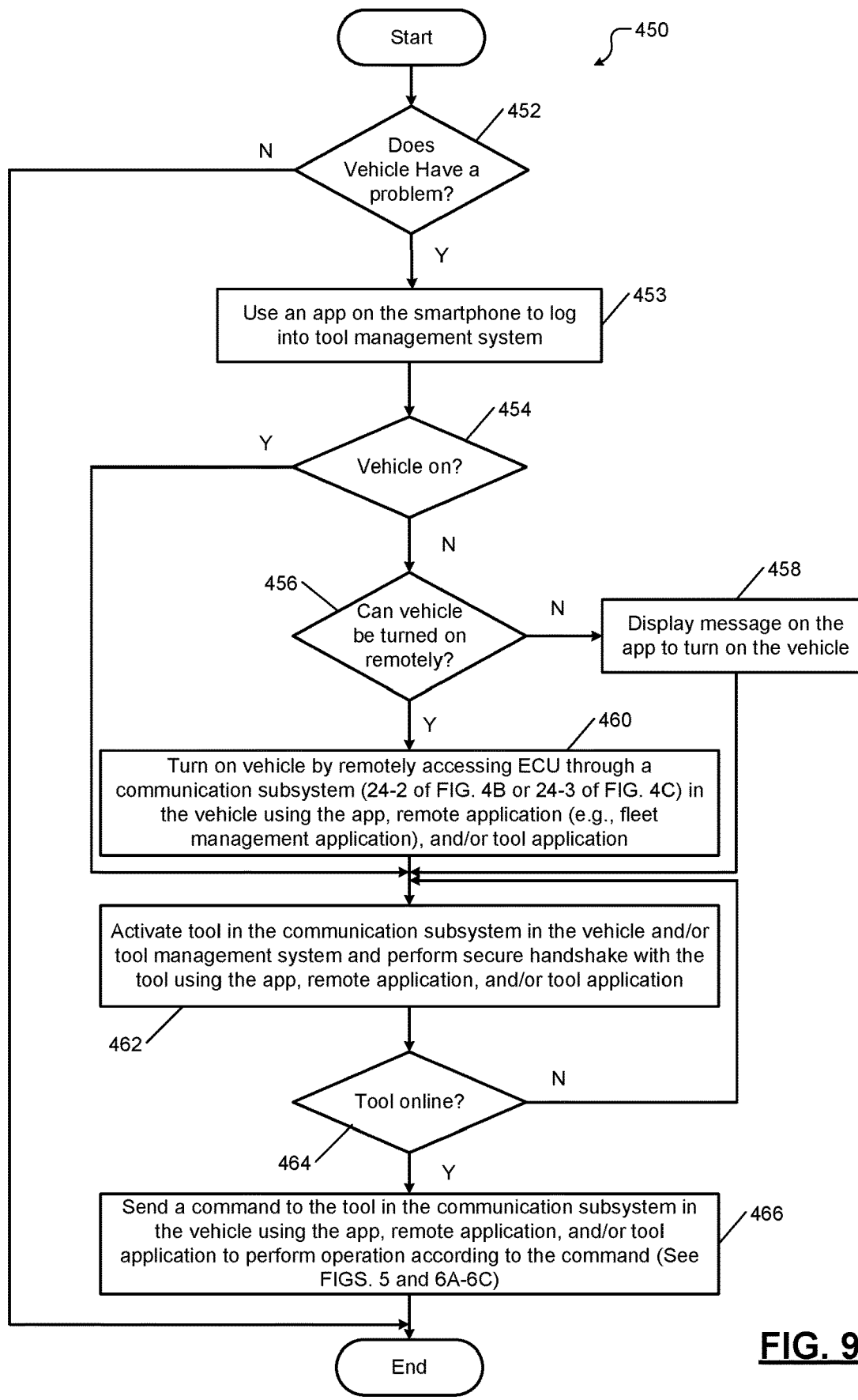

As shown in FIGS. 8A and 8B, the tool application can access the reset tool in either chip using a communication circuit (e.g., element 122) in the chip, which is also used by the remote application (e.g., the fleet management application) to access the pre-existing communication chip. Alternatively, as shown in FIGS. 9A and 9B, the tool application can access the reset tool in either chip via a mobile device (e.g., driver's smartphone) using Bluetooth connectivity between the mobile device and either chip and using cellular connectivity between the mobile device and the tool application. Such access of the reset tool by the tool application can be independent of (i.e., without using) the remote application (e.g., the fleet management application). The tool application can also access the reset tool in the pre-existing communication chip (e.g., element 24-2 comprising the ELD 120 shown in FIG. 4B) using the pre-existing cellular connectivity between the mobile device and the remote application (e.g., a fleet management application).

FIG. 8B shows a method 400 performed by the elements shown in FIG. 8A. At 402, control determines whether the vehicle has a problem (e.g., if any of the ECUs 12 have a fault code). If the vehicle has a problem, at 404, control determines whether the vehicle is turned on. Control proceeds to 412 if the vehicle is turned on. If the vehicle is not turned on, at 406, control determines whether the vehicle can be turned on remotely (using the remote application and/or the tool application). If the vehicle cannot be turned on remotely, at 408, control contacts the driver of the vehicle to turn on the vehicle, and control proceeds to 412. For example, the remote application and/or the tool application can call the driver or send a message on the driver's mobile device. If the vehicle can be turned on remotely, at 410, control turns on the vehicle remotely by accessing an ECU (e.g., the engine ECU) through the pre-existing communication chip (e.g., element 24-2 comprising the ELD 120 shown in FIG. 4B) or the customized communication chip (e.g., element 24-3 shown in FIG. 4C) in the vehicle (hereinafter referred to as either chip or the chip).

At 412, control activates the reset tool integrated in either chip and performs a secure handshake with the reset tool using the remote application and/or the tool application. At 414, control determines whether the reset tool is online (i.e., operational and ready) to receive the command. Control returns to 412 or optionally to 410 if the reset tool is not online. If the reset tool is online, at 416, control sends a command to the reset tool using the remote application and/or the tool application to perform an operation indicated by the command. For example, the operation may include resetting one or more fault codes, resetting the AFT, or regenerating the DPF. Based on the command, control performs one of the methods shown and described with reference to FIGS. 5 and 6A-6C.

FIG. 9A shows the implementation shown in FIG. 8A with the addition of the mobile device (e.g., the driver's smartphone), which is shown as the client device 320-1 (shown in FIG. 7A). FIG. 9B shows a method 450 performed by the elements shown in FIG. 9A.

In FIG. 9B, at 452, control determines whether the vehicle has a problem (e.g., if any of the ECUs 12 have a fault code). If the vehicle has a problem, at 453, the driver logs into the tool application using an app on the driver's mobile device. In some implementations, the driver may also use the app to report a problem with the vehicle as an alternative to element 452.

At 454, control determines whether the vehicle is turned on (e.g., by communicating with either chip directly or via the mobile device). Control proceeds to 462 if the vehicle is turned on. If the vehicle is not turned on, at 456, control determines whether the vehicle can be turned on remotely (using the app, the remote application, and/or the tool application). If the vehicle cannot be turned on remotely, at 458, control displays a message on the driver's mobile device to ask the driver to turn on the vehicle, and control proceeds to 462. For example, the remote application and/or the tool application can call the driver or send a message on the driver's mobile device. If the vehicle can be turned on remotely, at 460, control turns on the vehicle remotely by accessing an ECU (e.g., the engine ECU) through the pre-existing communication chip (e.g., element 24-2 comprising the ELD 120 shown in FIG. 4B) or the customized communication chip (e.g., element 24-3 shown in FIG. 4C) in the vehicle (hereinafter referred to as either chip or the chip). For example, the remote application and/or the tool application may access either chip using the app on the driver's mobile device.

At 462, control activates the reset tool integrated in either chip and performs a secure handshake with the reset tool using the remote application, the tool application, and/or the app on the driver's mobile device. At 464, control determines whether the reset tool is online (i.e., operational and ready) to receive the command using the remote application, the tool application, and/or the app on the driver's mobile device. Control returns to 462 or optionally to 460 if the reset tool is not online. If the reset tool is online, at 466, control sends a command to the reset tool using the remote application, the tool application, and/or the app on the driver's mobile device to perform an operation indicated by the command. For example, the operation may include resetting one or more fault codes, resetting the AFT, or regenerating the DPF. Based on the command, control performs one of the methods shown and described with reference to FIGS. 5 and 6A-6C.

Figure 10A:
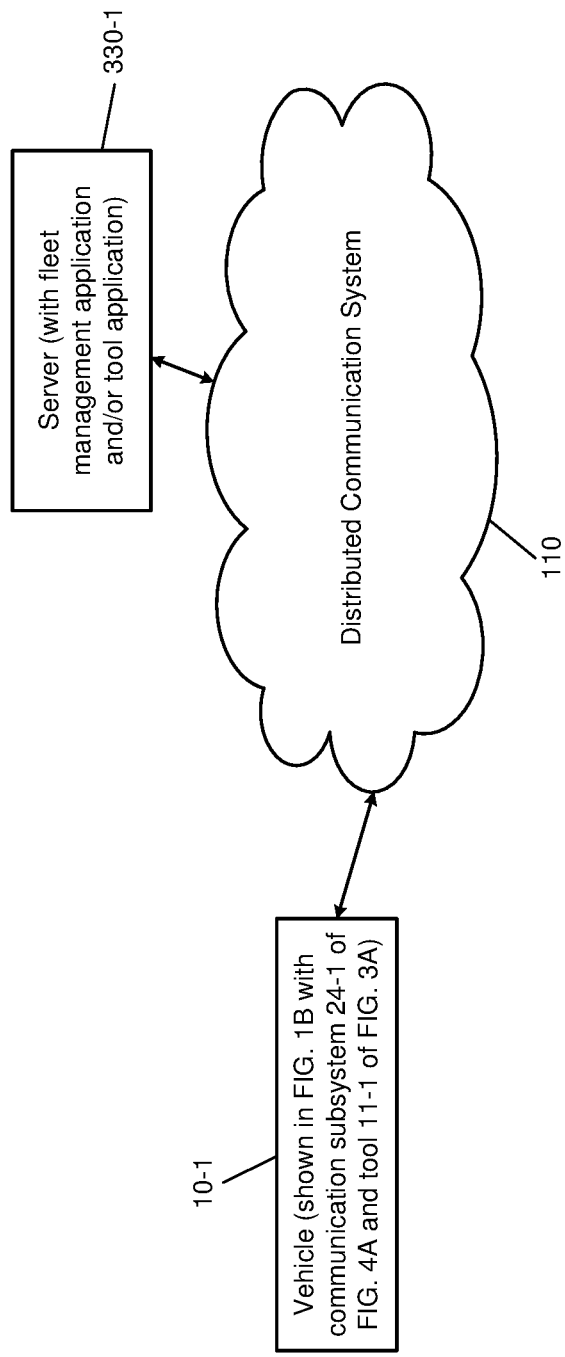

FIGS. 10A-11B show other ways of implementing the systems and methods of the present disclosure described above. For example, as shown in FIGS. 10A and 11A, the reset tool 11-1 shown in FIG. 3A can be used with a pre-existing communication chip (e.g., element 24-1 comprising the ELD 120 shown in FIG. 4A) of a vehicle (e.g., element 10-1 shown in FIG. 1B). In this implementation, the pre-existing communication chip is used as is (i.e., is not modified to integrate functionalities of the reset tool 11-1). A server (e.g., element 330-1 shown in FIGS. 7A, 10A, and 11A) may execute the tool application alone or in combination with a remote application associated with the pre-existing communication chip (e.g., a fleet management application).

Figure 10B:
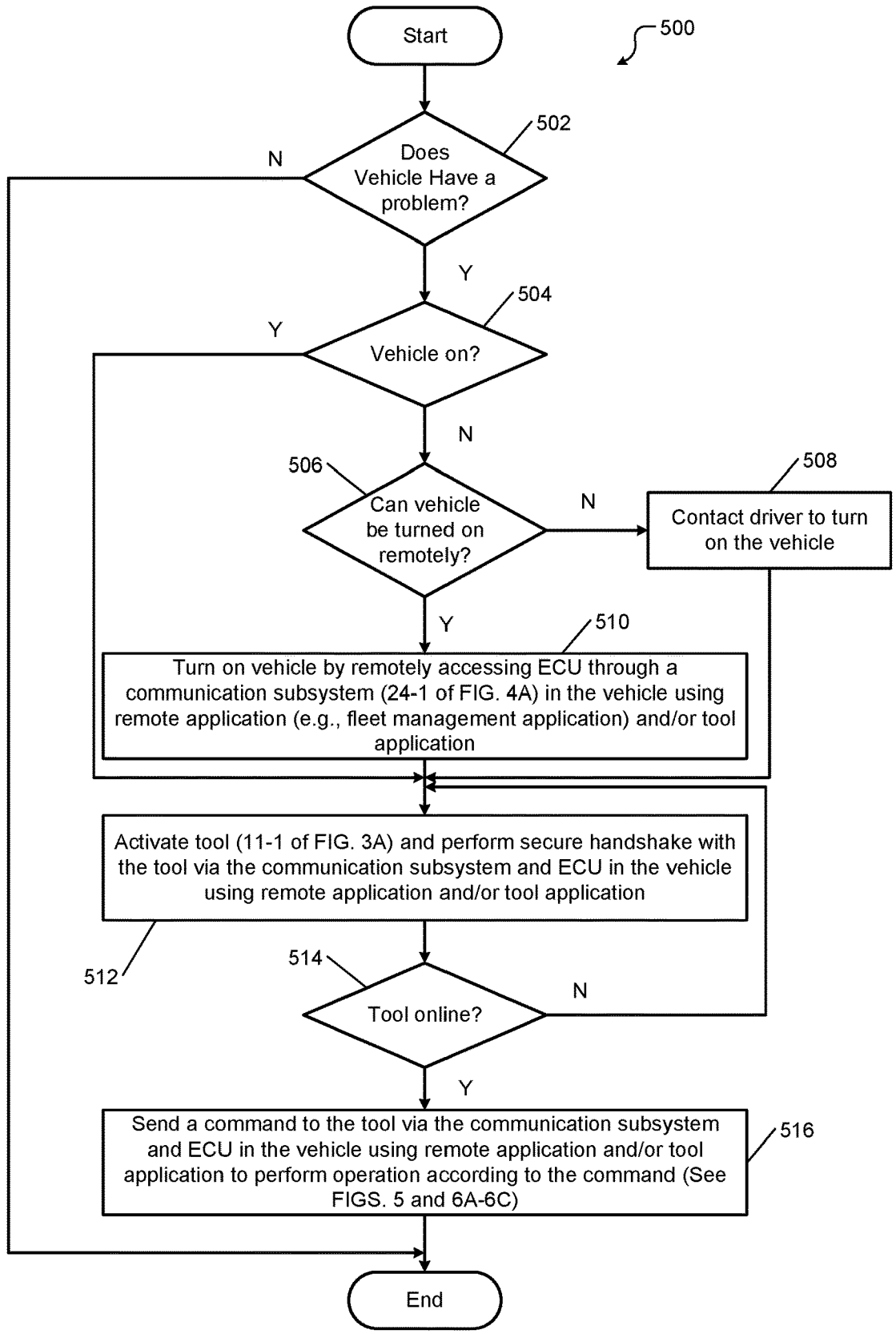

As shown in FIGS. 10A and 10B, the tool application can be integrated with the remote application associated with the pre-existing communication chip (e.g., the fleet management application). The tool application can access the pre-existing communication chip (e.g., element 24-1 comprising the ELD 120 shown in FIG. 4A; hereinafter the chip) through the remote application. The chip already communicates with an ECU (e.g., the engine ECU). The ECU communicates with the reset tool 11-1 plugged into (hardwired to) the OBD port in the vehicle. Thus, the tool application can access the reset tool 11-1 via the chip via the ECU.

FIG. 10B shows a method 500 performed by the elements shown in FIG. 10A. At 502, control determines whether the vehicle has a problem (e.g., if any of the ECUs 12 have a fault code). If the vehicle has a problem, at 504, control determines whether the vehicle is turned on. Control proceeds to 512 if the vehicle is turned on. If the vehicle is not turned on, at 506, control determines whether the vehicle can be turned on remotely (using the remote application and/or the tool application). If the vehicle cannot be turned on remotely, at 508, control contacts the driver of the vehicle to turn on the vehicle, and control proceeds to 512. For example, the remote application and/or the tool application can call the driver or send a message on the driver's mobile device. If the vehicle can be turned on remotely, at 510, control turns on the vehicle remotely by accessing an ECU (e.g., the engine ECU) through the pre-existing communication chip (e.g., element 24-1 comprising the ELD 120 shown in FIG. 4A) in the vehicle (the chip).

At 512, control activates the reset tool 11-1 and performs a secure handshake with the reset tool 11-1 via the chip and the ECU in the vehicle using the remote application and/or the tool application. At 514, control determines whether the reset tool 11-1 is online (i.e., operational and ready) to receive the command. Control returns to 512 or optionally to 510 if the reset tool 11-1 is not online. If the reset tool 11-1 is online, at 516, control sends a command to the reset tool 11-1 via the chip and the ECU in the vehicle using the remote application and/or the tool application to perform an operation indicated by the command. For example, the operation may include resetting one or more fault codes, resetting the AFT, or regenerating the DPF. Based on the command, control performs one of the methods shown and described with reference to FIGS. 5 and 6A-6C.

Figure 11A:
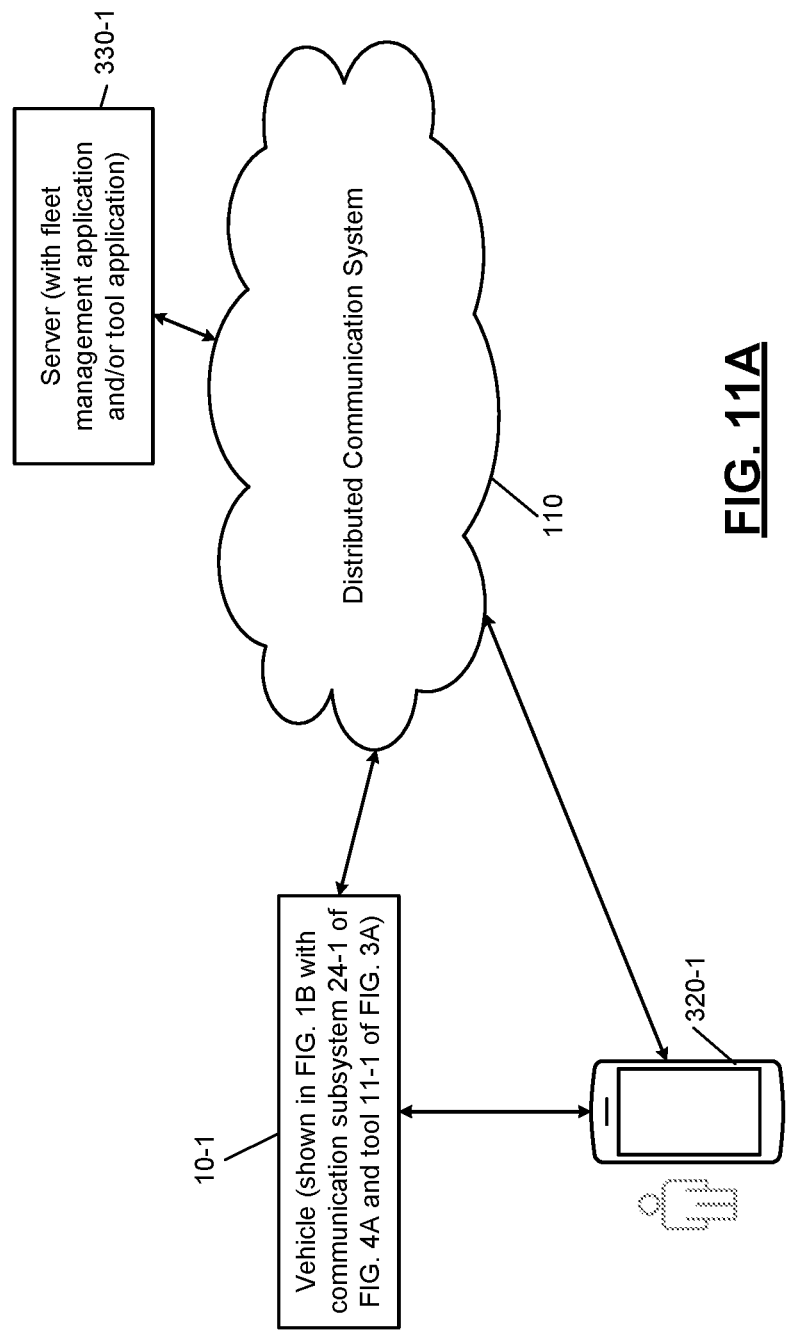
Figure 11B:
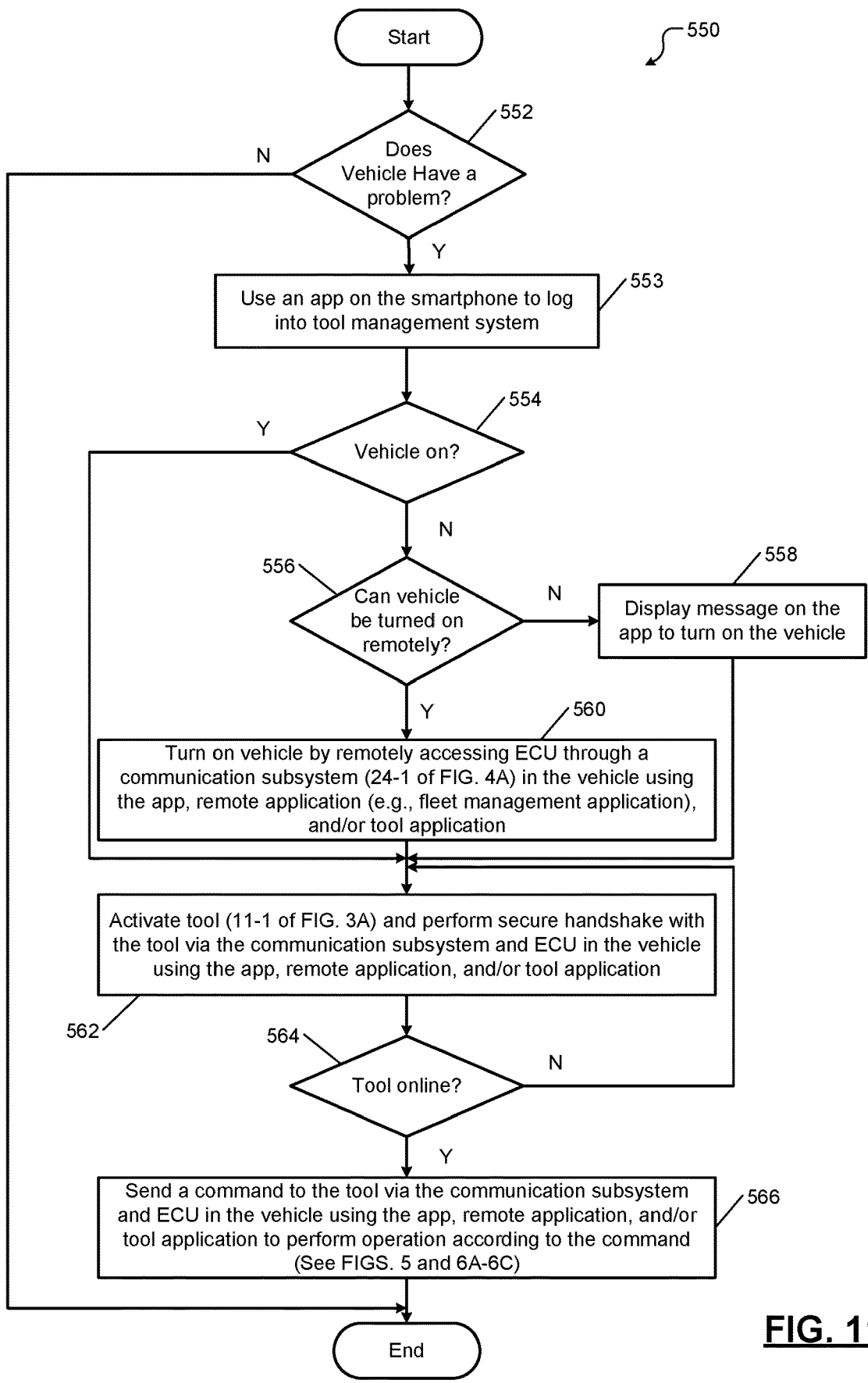

Alternatively, as shown in FIGS. 11A and 11B, the tool application can be integrated with the remote application (e.g., a fleet management application) associated with the pre-existing communication chip (e.g., element 24-1 comprising the ELD 120 shown in FIG. 4A) in the vehicle (the chip). Additionally, a mobile application (app) on a mobile device (e.g., the driver's smartphone) communicates with the tool application. The mobile device connects to the chip via Bluetooth. The chip already communicates with the ECU (e.g., the engine ECU). The ECU communicates with the reset tool 11-1 plugged into (hardwired to) the OBD port in the vehicle. Thus, the app can access the reset tool 11-1 via the chip via the ECU under the control of the tool application.

The tool application can access the reset tool 11-1 via a Bluetooth circuit in the pre-existing communication chip (e.g., element 24-1 comprising the ELD 120 shown in FIG. 4A) in the vehicle (the chip) using Bluetooth connectivity between the driver's mobile device and the chip and using cellular connectivity between the mobile device and the tool application. Such access of the reset tool 11-1 by the tool application can be independent of (i.e., without using) the remote application (e.g., the fleet management application). The tool application can also access the reset tool 11-1 using the pre-existing cellular connectivity between the mobile device and the remote application (e.g., the fleet management application).

FIG. 11B shows a method 550 performed by the elements shown in FIG. 11A. At 552, control determines whether the vehicle has a problem (e.g., if any of the ECUs 12 have a fault code). If the vehicle has a problem, at 553, the driver logs into the tool application using an app on the driver's mobile device. In some implementations, the driver may also use the app to report a problem with the vehicle as an alternative to element 552.

At 554, control determines whether the vehicle is turned on (e.g., by communicating with the chip directly or via the mobile device). Control proceeds to 562 if the vehicle is turned on. If the vehicle is not turned on, at 556, control determines whether the vehicle can be turned on remotely (using the app, the remote application, and/or the tool application). If the vehicle cannot be turned on remotely, at 558, control displays a message on the driver's mobile device to ask the driver to turn on the vehicle, and control proceeds to 562. For example, the remote application and/or the tool application can call the driver or send a message on the driver's mobile device. If the vehicle can be turned on remotely, at 560, control turns on the vehicle remotely by accessing an ECU (e.g., the engine ECU) through the pre-existing communication chip (e.g., element 24-1 comprising the ELD 120 shown in FIG. 4A) in the vehicle (the chip). For example, the remote application and/or the tool application may access the chip using the app on the driver's mobile device.

At 562, control activates the reset tool 11-1 and performs a secure handshake with the reset tool 11-1 using the remote application, the tool application, and/or the app on the driver's mobile device. At 564, control determines whether the reset tool 11-1 is online (i.e., operational and ready) to receive the command using the remote application, the tool application, and/or the app on the driver's mobile device. Control returns to 562 or optionally to 560 if the reset tool 11-1 is not online. If the reset tool 11-1 is online, at 566, control sends a command to the reset tool 11-1 using the remote application, the tool application, and/or the app on the driver's mobile device to perform an operation indicated by the command. For example, the operation may include resetting one or more fault codes, resetting the AFT, or regenerating the DPF. Based on the command, control performs one of the methods shown and described with reference to FIGS. 5 and 6A-6C.

FIGS. 12A-13B show additional ways of implementing the systems and methods of the present disclosure described above. For example, only a part of the reset tool may be embedded in the pre-existing communication chip (e.g., element 24-1 comprising the ELD 120 shown in FIG. 4A) in the vehicle (the chip) and the rest of the reset tool is hardwired to the vehicle through the OBD port. This implementation is a variation of FIGS. 10A-11B in that the chip is modified only to the extent necessary to communicate directly with the reset tool 11-1 plugged into the OBD port (via the CAN bus) rather than communicating through the ECU. Preferably, only firmware in the chip is modified, and no hardware from the reset tool 11-1 is added to the chip. The tool application and/or the app on the mobile device can access the reset tool 11-1 directly via the chip without going through the ECU (i.e., without going from the chip to the ECU to reset tool 11-1).

Figure 12A:
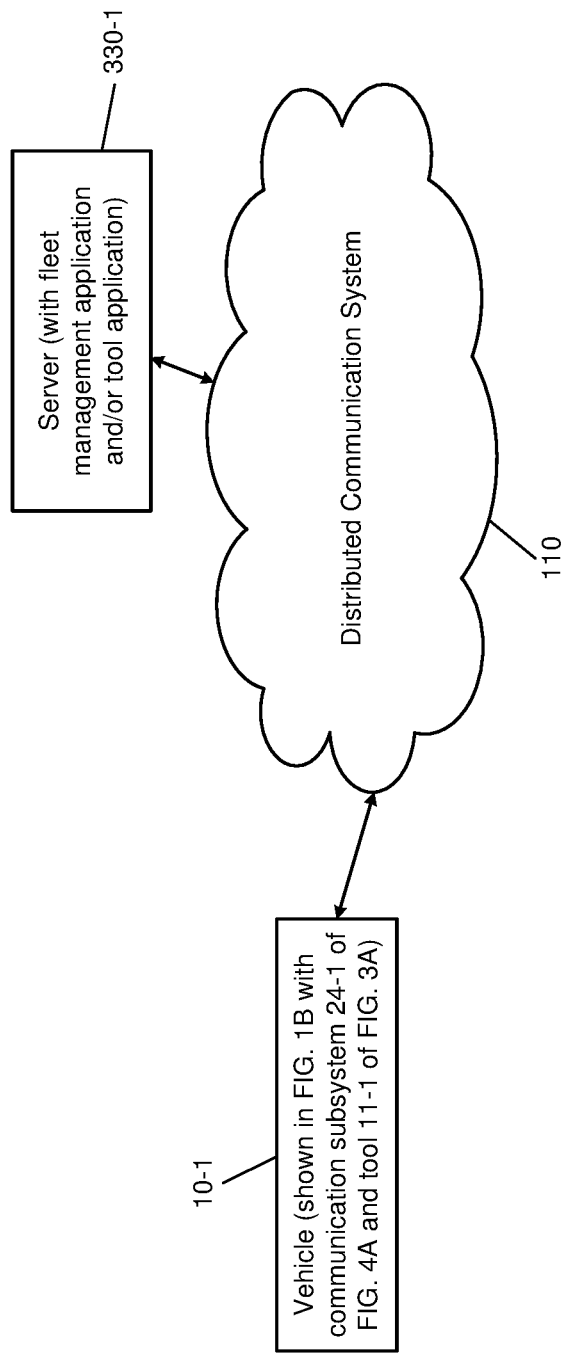
Figure 13A:
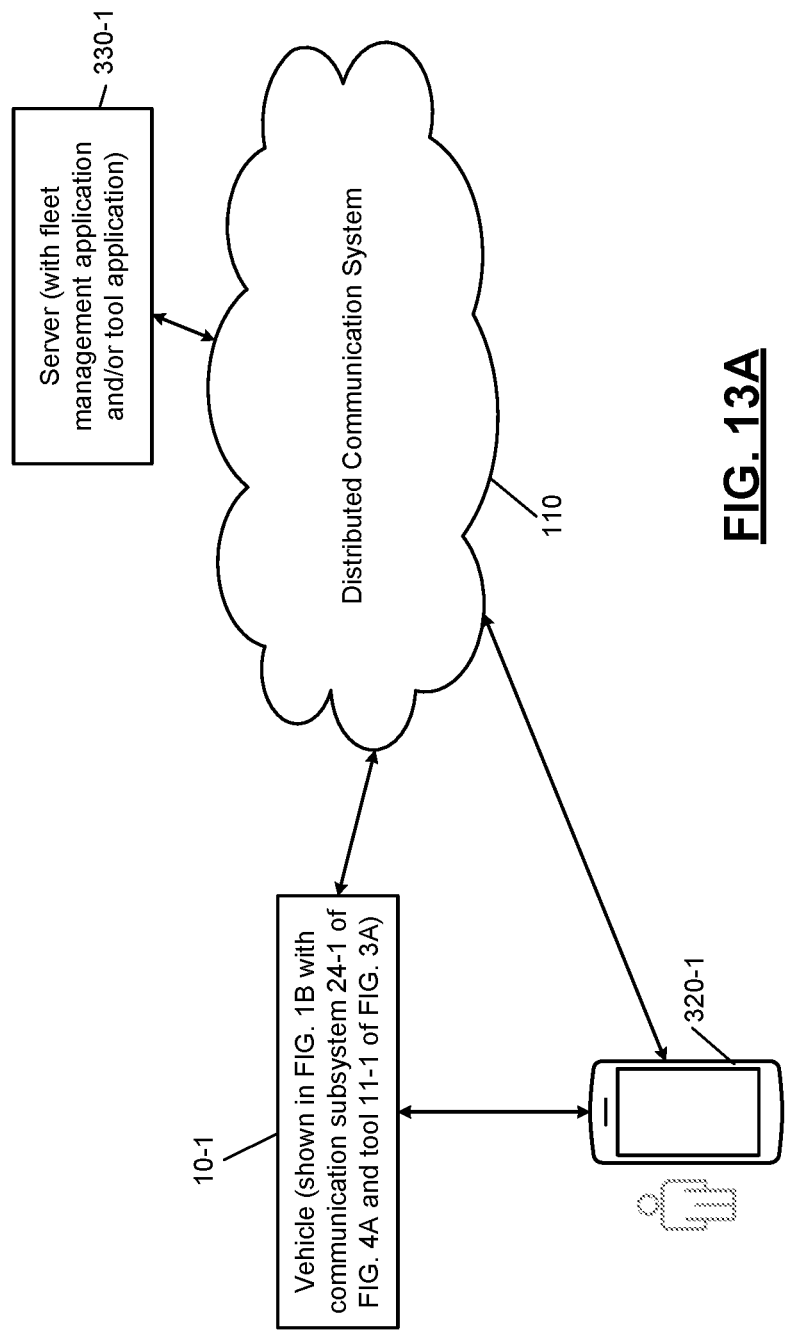

Accordingly, as shown in FIGS. 12A and 13A, the reset tool 11-1 shown in FIG. 3A can be used with a pre-existing communication chip (e.g., element 24-1 comprising the ELD 120 shown in FIG. 4A) of a vehicle (e.g., element 10-1 shown in FIG. 1B). The pre-existing communication chip is modified only to the extent necessary to access the reset tool 11-1 without going through an ECU (e.g., the engine ECU). A server (e.g., element 330-1 shown in FIGS. 7A, 12A, and 13A) may execute the tool application alone or in combination with a remote application associated with the pre-existing communication chip (e.g., a fleet management application).

Figure 12B:
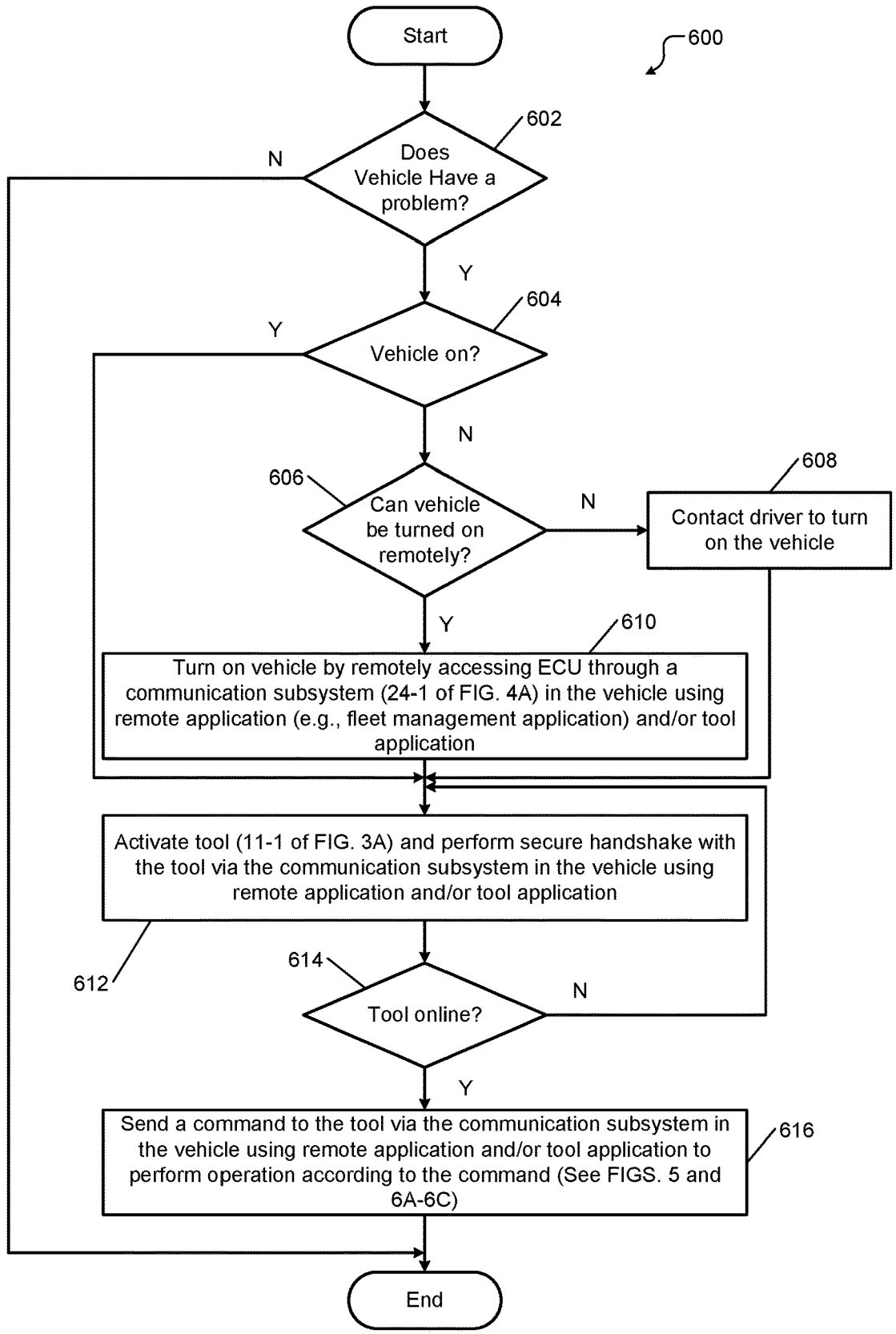

FIG. 12B shows a method 600 performed by the elements shown in FIG. 12A. At 602, control determines whether the vehicle has a problem (e.g., if any of the ECUs 12 have a fault code). If the vehicle has a problem, at 604, control determines whether the vehicle is turned on. Control proceeds to 612 if the vehicle is turned on. If the vehicle is not turned on, at 606, control determines whether the vehicle can be turned on remotely (using the remote application and/or the tool application). If the vehicle cannot be turned on remotely, at 608, control contacts the driver of the vehicle to turn on the vehicle, and control proceeds to 612. For example, the remote application and/or the tool application can call the driver or send a message on the driver's mobile device. If the vehicle can be turned on remotely, at 610, control turns on the vehicle remotely through the pre-existing communication chip (e.g., element 24-1 comprising the ELD 120 shown in FIG. 4A) in the vehicle (the chip) that is modified to access the reset tool 11-1 without accessing an ECU (e.g., the engine ECU).

At 612, control activates the reset tool 11-1 and performs a secure handshake with the reset tool 11-1 directly via the chip (i.e., without going through the ECU) in the vehicle using the remote application and/or the tool application. At 614, control determines whether the reset tool 11-1 is online (i.e., operational and ready) to receive the command. Control returns to 612 or optionally to 610 if the reset tool 11-1 is not online. If the reset tool 11-1 is online, at 616, control sends a command to the reset tool 11-1 directly via the chip (i.e., without going through the ECU) in the vehicle using the remote application and/or the tool application to perform an operation indicated by the command. For example, the operation may include resetting one or more fault codes, resetting the AFT, or regenerating the DPF. Based on the command, control performs one of the methods shown and described with reference to FIGS. 5 and 6A-6C.

Figure 13B:
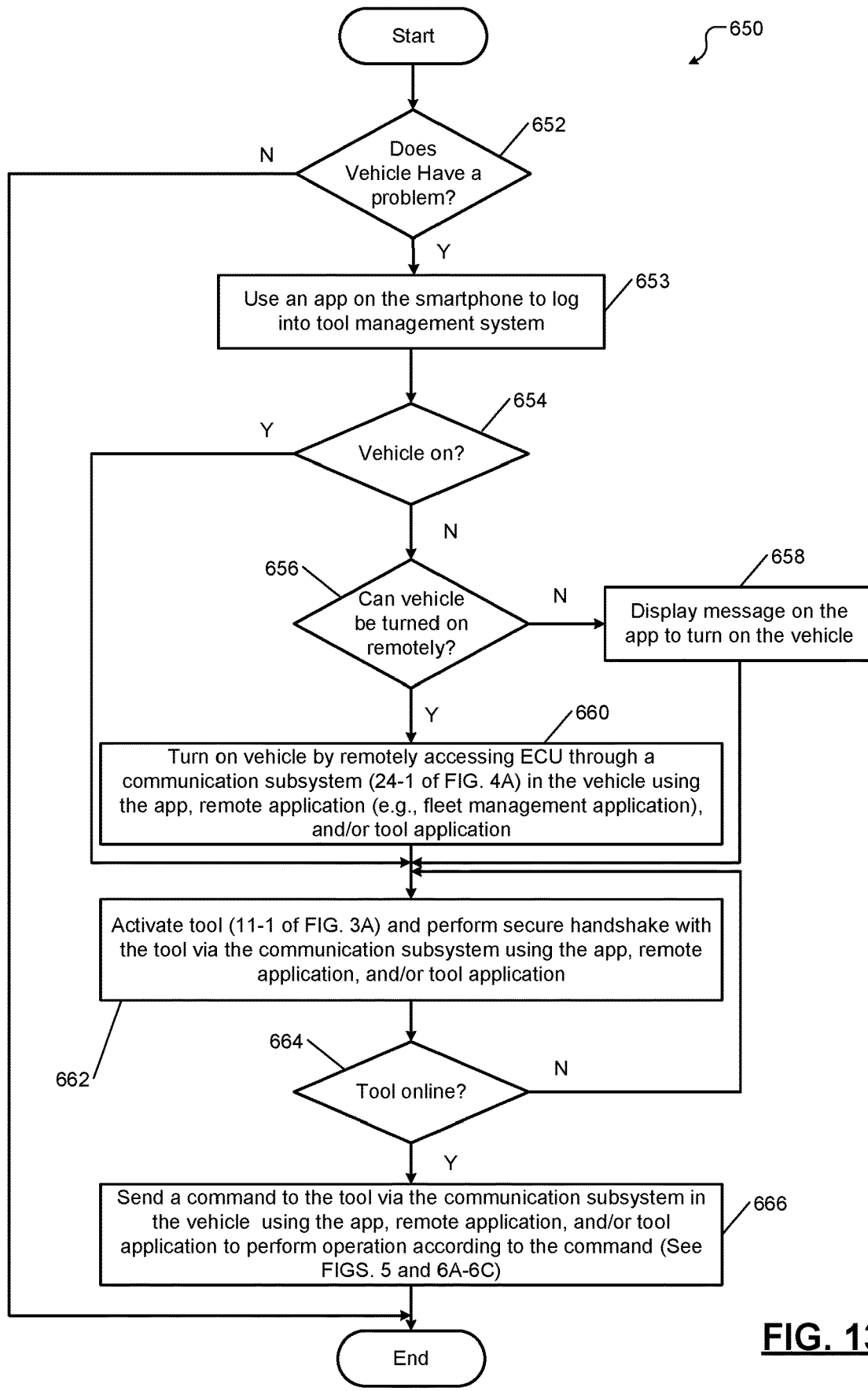

Alternatively, as shown in FIGS. 13A and 13B, the tool application can be integrated with the remote application (e.g., a fleet management application) associated with the pre-existing communication chip (e.g., element 24-1 comprising the ELD 120 shown in FIG. 4A) in the vehicle (the chip), which is modified only to the extent necessary to access the reset tool 11-1 without going through an ECU (e.g., the engine ECU). Additionally, a mobile application (app) on a mobile device (e.g., the driver's smartphone) communicates with the tool application. The mobile device connects to the chip via Bluetooth. Thus, the app can access the reset tool 11-1 directly via the chip (i.e., without going through the ECU) under the control of the tool application.

The tool application can access the reset tool 11-1 via a Bluetooth circuit in the pre-existing communication chip (e.g., element 24-1 comprising the ELD 120 shown in FIG. 4A, which is modified to access the reset tool 11-1 without going through the ECU) in the vehicle (the chip). The tool application can access the reset tool 11-1 using Bluetooth connectivity between the driver's mobile device and the chip and using cellular connectivity between the mobile device and the tool application. Such access of the reset tool 11-1 by the tool application can be independent of (i.e., without using) the remote application (e.g., the fleet management application). The tool application can also access the reset tool 11-1 using the pre-existing cellular connectivity between the mobile device and the remote application (e.g., the fleet management application).

FIG. 13B shows a method 650 performed by the elements shown in FIG. 13A. At 652, control determines whether the vehicle has a problem (e.g., if any of the ECUs 12 have a fault code). If the vehicle has a problem, at 653, the driver logs into the tool application using an app on the driver's mobile device. In some implementations, the driver may also use the app to report a problem with the vehicle as an alternative to element 652.

At 664, control determines whether the vehicle is turned on (e.g., by communicating with the chip directly or via the mobile device). Control proceeds to 662 if the vehicle is turned on. If the vehicle is not turned on, at 656, control determines whether the vehicle can be turned on remotely (using the app, the remote application, and/or the tool application). If the vehicle cannot be turned on remotely, at 658, control displays a message on the driver's mobile device to ask the driver to turn on the vehicle, and control proceeds to 662. For example, the remote application and/or the tool application can call the driver or send a message on the driver's mobile device. If the vehicle can be turned on remotely, at 660, control turns on the vehicle remotely by directly accessing the pre-existing communication chip (e.g., element 24-1 comprising the ELD 120 shown in FIG. 4A) in the vehicle (the chip) without going through an ECU (e.g., the engine ECU). For example, the remote application and/or the tool application may directly access the chip using the app on the driver's mobile device without going through the ECU.

At 662, control activates the reset tool 11-1 and performs a secure handshake with the reset tool 11-1 using the remote application, the tool application, and/or the app on the driver's mobile device. At 664, control determines whether the reset tool 11-1 is online (i.e., operational and ready) to receive the command using the remote application, the tool application, and/or the app on the driver's mobile device. Control returns to 662 or optionally to 660 if the reset tool 11-1 is not online. If the reset tool 11-1 is online, at 666, control sends a command to the reset tool 11-1 using the remote application, the tool application, and/or the app on the driver's mobile device to perform an operation indicated by the command. For example, the operation may include resetting one or more fault codes, resetting the AFT, or regenerating the DPF. Based on the command, control performs one of the methods shown and described with reference to FIGS. 5 and 6A-6C.

Figure 14B:
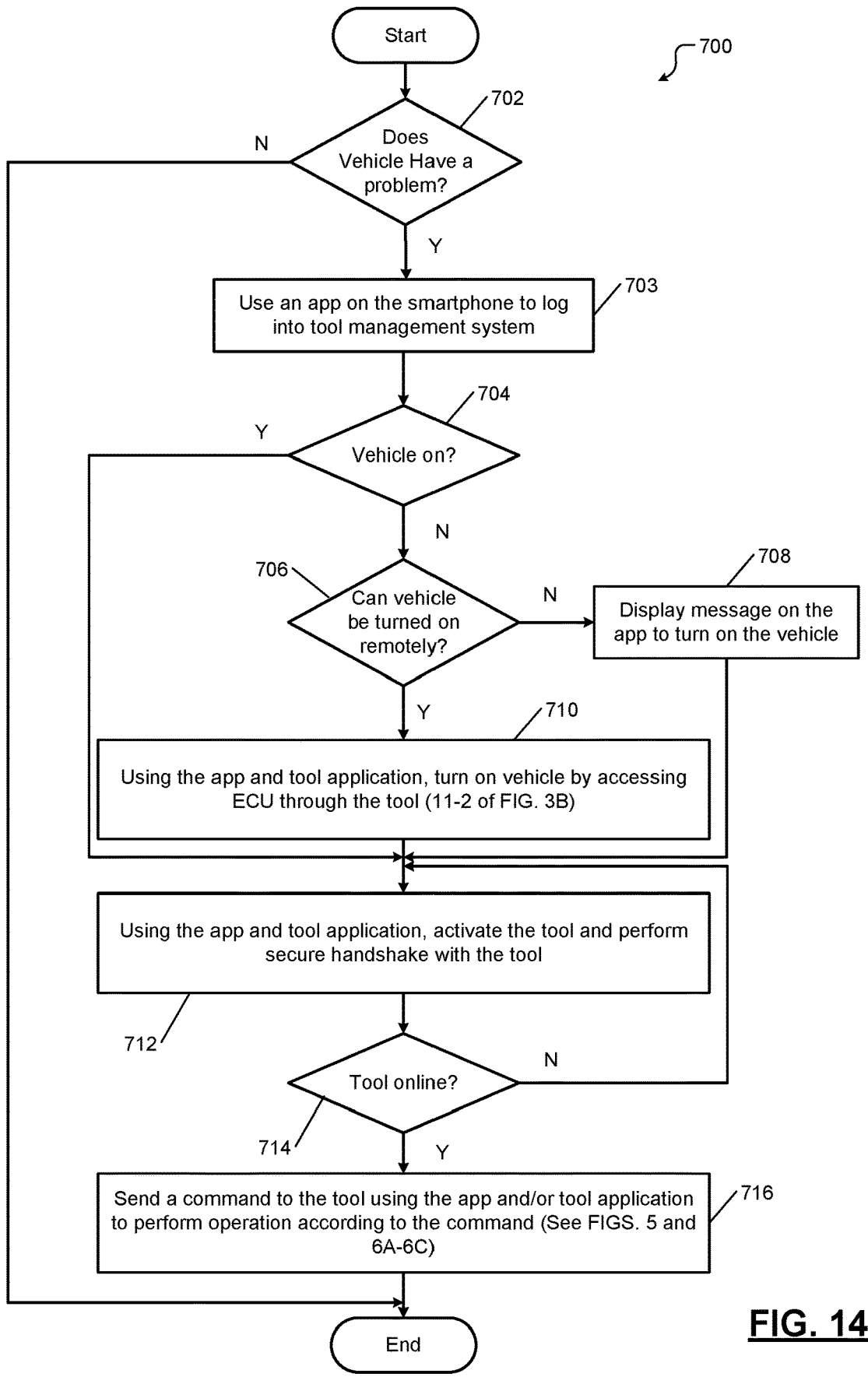

FIGS. 14A and 14B show another implementation. In this implementation, the reset tool 11-1 is modified to include a Bluetooth circuit. Such a reset tool is shown as element 11-2 in FIG. 3B. As shown in FIG. 14A, this implementation does not require any other communication chip (e.g., elements 24, 24-1, 24-2, and 24-3) in the vehicle and any associated remote application. The server 330-1 executes the tool application. The tool application can access the reset tool 11-2 via an app on the driver's mobile device using Bluetooth connectivity between the mobile device and the reset tool 11-2 and using cellular connectivity between the mobile device and the tool application.

FIG. 14B shows a method 700 performed by the elements shown in FIG. 14A. At 702, the method 700 determines whether the vehicle has a problem (e.g., if any of the ECUs 12 have a fault code). If the vehicle has a problem, at 703, the driver logs into the tool application using an app on the driver's mobile device and reports the problem to the tool application using the app.

At 704, control determines whether the vehicle is turned on (e.g., by communicating with an ECU such as the engine ECU via the mobile device and the reset tool 11-2). Control proceeds to 712 if the vehicle is turned on. If the vehicle is not turned on, at 706, control determines whether the vehicle can be turned on remotely (e.g., by communicating with an ECU such as the engine ECU via the mobile device and the reset tool 11-2). If the vehicle cannot be turned on remotely, at 708, control displays a message on the driver's mobile device to ask the driver to turn on the vehicle, and control proceeds to 712. For example, the tool application can call the driver or send a message on the driver's mobile device. If the vehicle can be turned on remotely, at 710, control turns on the vehicle remotely by accessing the ECU through the reset tool 11-2 using the tool application and the app on the driver's mobile device, and control proceeds to 712. This scenario presumes that at least the reset tool 11-2 receives power from the battery of the vehicle. If the reset tool 11-2 does not receive power from the battery of the vehicle and/or the driver cannot turn on the vehicle, the method 700 ends.

At 712, control activates the reset tool 11-2 and performs a secure handshake with the reset tool 11-2 using the tool application and the app on the driver's mobile device. At 714, control determines whether the reset tool 11-2 is online (i.e., operational and ready) to receive the command using the tool application and the app on the driver's mobile device. Control returns to 712 or optionally to 710 if the reset tool 11-2 is not online. If the reset tool 11-2 is online, at 716, control sends a command to the reset tool 11-2 using the tool application and the app on the driver's mobile device to perform an operation indicated by the command. For example, the operation may include resetting one or more fault codes, resetting the AFT, or regenerating the DPF. Based on the command, control performs one of the methods shown and described with reference to FIGS. 5 and 6A-6C.

In FIGS. 8A-14B, it should be understood that determining whether the reset tool is activated and whether the reset tool is online need not be distinct operations and can be combined into one operation. In some implementations, these operations can be omitted, and a command to perform any of the operations can be sent to the reset tool, presuming that the reset tool is activated and is online. Further, the feature to remotely turn on the vehicle shown in FIGS. 8A-14B may be optional. However, the feature may be useful in situations where the driver is unable to turn the vehicle on due to a fault code. In such a situation, the remote turn on feature may be able to bypass the fault code and turn on the vehicle.

Throughout the present disclosure, a vehicle is used for example only. The teachings of the present disclosure are not limited to vehicles. Rather, the systems and methods of the present disclosure can be used with any diesel powered equipment including but not limited to construction equipment, farming (agriculture) equipment, mining equipment, earth moving equipment, and so on. In other words, the term vehicle as used herein is not limited automobiles and trucks. Further, depending on the type of equipment, the operations performed by the reset tool may be different. The operations may include those that are otherwise performed by special diagnostic equipment, which the reset tool can perform instead.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), cellular network, or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for remotely controlling a plurality of subsystems of a vehicle, comprising:
   a processor; and
   a memory storing instructions which when executed by the processor cause the processor to:
   send a signal via a wireless network to activate a control circuit connected to a Controller Area Network (CAN) bus in the vehicle; and
   send a command via the wireless network to the control circuit to:
   clear a fault code associated with an Electronic Control Unit (ECU) controlling an exhaust subsystem of the vehicle via the CAN bus;
   reset parameters of the ECU controlling the exhaust subsystem of the vehicle to respective default values; and
   in response to the fault code recurring after clearing the fault code and resetting the parameters of the ECU controlling the exhaust subsystem and in response to a parked regeneration of a diesel particulate filter of the exhaust subsystem being disabled, initiate a forced regeneration of the diesel particulate filter of the exhaust subsystem of the vehicle.

2. The system of claim 1 wherein the instructions cause the processor to communicate with a mobile device via the wireless network and to send the signal, the command, or both to the control circuit via the mobile device, wherein the mobile device communicates with the control circuit using a short range wireless communication protocol.

3. The system of claim 2 wherein the wireless network includes a cellular network and wherein the short range wireless communication protocol includes Bluetooth.

4. The system of claim 1 wherein the instructions cause the processor to send the command to the control circuit to clear the fault code and to reset the parameters in response to an engine of the vehicle being turned off.

5. The system of claim 1 wherein the instructions cause the processor to send the command to the control circuit to initiate the forced regeneration in response to an engine of the vehicle being turned on and a speed of the vehicle being zero.

6. The system of claim 1 wherein the instructions cause the processor to send the command to the control circuit to initiate the forced regeneration in response to the parked regeneration of the diesel particulate filter being disabled.

7. The system of claim 1 wherein the instructions cause the processor to perform a security handshake with the control circuit via the wireless network before sending the command to the control circuit.

8. The system of claim 1 wherein the command causes the control circuit to perform an authentication procedure with the ECU and secure read/write access to the ECU.

9. The system of claim 1 wherein the command causes the control circuit to reset data learned by the ECU.

10. The system of claim 1 wherein the parameters include a soot level of the diesel particulate filter, an ash level of the diesel particulate filter, a zone level of the diesel particulate filter, regeneration timers of the diesel particulate filter, data learned after a prior regeneration of the diesel particulate filter, NOx sensor data, or an efficiency of a selective catalytic reduction component of the exhaust subsystem.

11. A system for controlling a plurality of subsystems of a vehicle, comprising:
   a control circuit to communicate with a plurality of Electronic Control Units (ECUs) of the vehicle respectively controlling the plurality of subsystems of the vehicle via a Controller Area Network (CAN) bus of the vehicle; and
   a communication circuit to receive a command from a remote device via a wireless network to activate the control circuit to:
      clear a fault code associated with one of the plurality of ECUs controlling an exhaust subsystem of the vehicle;
      reset parameters of the one of the plurality of ECUs controlling the exhaust subsystem of the vehicle to respective default values; and
      in response to the fault code recurring after clearing the fault code and resetting the parameters of the one of the plurality of ECUs controlling the exhaust subsystem and in response to a parked regeneration of a diesel particulate filter of the exhaust subsystem being disabled, initiate a forced regeneration of the diesel particulate filter of the exhaust subsystem of the vehicle.

12. The system of claim 11 wherein the communication circuit is configured to communicate with a mobile device using a short range wireless communication protocol and wherein the mobile device is configured to receive the command from the remote device via the wireless network.

13. The system of claim 12 wherein the wireless network includes a cellular network and wherein the short range wireless communication protocol includes Bluetooth.

14. The system of claim 11 wherein the control circuit is configured to clear the fault code and reset the parameters in response to an engine of the vehicle being turned off.

15. The system of claim 11 wherein the control circuit is configured to initiate the forced regeneration in response to an engine of the vehicle being turned on and a speed of the vehicle being zero.

16. The system of claim 11 wherein the control circuit is configured to initiate the forced regeneration in response to the parked regeneration of the diesel particulate filter being disabled.

17. The system of claim 11 wherein the communication circuit is configured to receive a signal to activate the control circuit from the remote device via the wireless network before receiving the command from the remote device via the wireless network.

18. The system of claim 11 wherein the control circuit is configured to perform a security handshake with the remote device via the wireless network before receiving the command from the remote device via the wireless network.

19. The system of claim 11 wherein in response to receiving the command, the control circuit is configured to perform an authentication procedure with the ECU and secure read/write access to the ECU.

20. The system of claim 11 wherein in response to receiving the command, the control circuit is configured to reset data learned by the ECU.

* * * * *